United States Patent

Nagata et al.

[11] Patent Number: 5,918,480
[45] Date of Patent: Jul. 6, 1999

[54] REFRIGERATOR

[75] Inventors: Kohji Nagata; Masatoshi Inatani, both of Osaka; Noriko Shinohara, Shiga, all of Japan

[73] Assignee: Matsushita Refrigeration Company, Osaka, Japan

[21] Appl. No.: 08/619,587

[22] PCT Filed: Aug. 3, 1995

[86] PCT No.: PCT/JP95/01542

§ 371 Date: Mar. 26, 1996

§ 102(e) Date: Mar. 26, 1996

[87] PCT Pub. No.: WO96/04514

PCT Pub. Date: Feb. 15, 1996

[30] Foreign Application Priority Data

| Aug. 3, 1994 | [JP] | Japan | 6/182272 |
| Nov. 24, 1994 | [JP] | Japan | 6-289619 |
| Nov. 24, 1994 | [JP] | Japan | 6/289620 |

[51] Int. Cl.⁶ .................................................. F25D 11/00
[52] U.S. Cl. ............................ 62/440; 62/382; 220/373; 215/310; 99/467
[58] Field of Search ............................ 62/440, 441, 382; 220/371, 372, 373, 374; 215/261, 308, 309; 99/467

[56] References Cited

U.S. PATENT DOCUMENTS

| 4,949,847 | 8/1990 | Nagata | 206/484.1 |
| 5,031,796 | 7/1991 | Schafer et al. | 220/371 |
| 5,395,006 | 3/1995 | Verma | 215/308 |

FOREIGN PATENT DOCUMENTS

| 0240 955 | 10/1987 | European Pat. Off. . |
| 0248 370 | 12/1987 | European Pat. Off. . |
| 0358 406 | 3/1990 | European Pat. Off. . |
| 0478 122 | 4/1992 | European Pat. Off. . |
| 2269005 | 1/1994 | United Kingdom . |

*Primary Examiner*—John M. Sollecito
*Attorney, Agent, or Firm*—Wood, Phillips, VanSanten, Clark & Mortimer

[57] ABSTRACT

The invention provides an improved refrigerator incorporating a vegetable-storage chamber in which, using moisture-permeable films capable of automatically varying humid-permeability, humidity inside of a vegetable-storage container is automatically and securely controllable to prevent dewing symptom from being generated therein while always preserving high humidity suited for vegetables and other produce to make it possible to store.

The inventive refrigerator incorporates a vegetable storage container 18 having open top-surface and provides a lid member 19 in close contact with and by way of covering the open top surface of the vegetable storage container 18. The lid member 19 is provided with moisture-permeable films 20 comprising a humid-vapor-permeable basic cloth 21 made from nylon or polyester resin and a hydrophilic shape-memory resin film 22 made from polyurethane resin or the like.

39 Claims, 10 Drawing Sheets

REFRIGERATOR

FIELD OF THE INVENTION

The present invention relates to a refrigerator incorporating a substantially closed type vegetable storage chamber for storing vegetables and other types of produce in fresh condition for a long period of time.

BACKGROUND ART

As was disclosed in the Japanese Laid-Open Patent Publication No. SHO63-3784 of 1988 for example, in order to store vegetable in fresh condition for a long while in a refrigerator, a method for providing a moisture-sensitive sheet to cover an air-vent of a substantially closed type vegetable container in a refrigerator was proposed.

Structure of this conventional refrigerator cited above is described below.

FIG. 27 is a cross-sectional view of a vegetable storage chamber of the above proposed conventional refrigerator, in which the reference numeral 1 designates the main body of the refrigerator incorporating a freezing chamber (not illustrated) at the top portion, a refrigerating chamber 2 and a vegetable-storage chamber 3 there below.

The reference numeral 4 designates a partition board for partitioning the refrigerating chamber 2 off from the vegetable-storage chamber 3. A pair of air-vents 5 and 6 are provided in the front and rear portions for circulating cooling air therebetween. The reference numeral 7 designates a vegetable storage container which is set inside of the vegetable-storage chamber 3 and has an open upper surface. The vegetable-storage container 7 can optionally be pulled out towards the front while the door 8 is open.

The reference numeral 9 designates a lid which is engageable with and disengageable from the upper surface of the vegetable-storage container 7 to make up a storage container in conjunction with the vegetable-storage container 7. A circular air-vent 10 is provided through the lid 9. In addition, an upwardly folded air-dividing plate 11 is provided at the rear edge of the lid 9.

The reference numeral 12 designates a rectangular moisture-sensitive sheet composed of polyvinyl-alcoholic film for example. As shown in FIG. 28, opposite edges of the moisture-sensitive sheet 12 are secured to bottom surface of the lid 9 with adhesive agent 13 by way of covering the circular air-vent 10. For example, whenever humidity increases beyond 80%, the moisture-sensitive sheet 12 inherently expands and elongates itself, whereas it inherently contracts itself whenever dry condition is generated via decrease of humidity below 80%.

The above-cited conventional refrigerator exerts refrigerating function as described below. After passing through the air-vent 5 of the partitioning board 4, cooled air from the refrigerating chamber 2 is divided by the air-dividing plate 11 and then led to the upper surface of the lid 9 and rear portion of the vegetable-storage container 7.

Then, part of cooled air led to the upper surface of the lid 9 flows into the vegetable-storage container 7 via the air-vent 10 formed through the lid 9, whereas the remaining cooled air and the cooled air passing by the rear surface of the vegetable-storage container 7 respectively return to the refrigerating chamber 2 via the air-vent 6 of the partitioning board 4.

Now, while vegetables are stored under a low temperature cooled by the flow of cooling air described above and whenever the air-vent 10 shown in FIG. 28 remains open, humidity inside of the vegetable-storage container 7 gradually lowers. When humidity lowers below 80%, the moisture-sensitive sheet 12, thus far opening the air-vent 10, contracts itself via drying to adhere to the lid 9 as shown in FIG. 29, thus shutting off the air-vent 10.

On the other hand, while the vegetable-storage container 7 is fully closed, humidity inside of the container 7 increases due to presence of humid vapor emitted via respiratory function of stored vegetables. When humidity exceeds 80%, the moisture-sensitive sheet 12, thus far closing the air-vent 10, gradually expands and elongates itself to open the air-vent 10 again as shown in FIG. 28.

Accordingly, the above-structured refrigerator can prevent the interior of the vegetable-storage container 7 from remaining excessively dry or humid for a long while, thus making it possible to store vegetables for a long while.

Nevertheless, according to the above structure, since the air-vent 10 is opened and closed solely by gradual expansion and elongation and gradual contraction via drying of the moisture-sensitive sheet 12, responsiveness is extremely poor.

In consequence, the above conventional refrigerator cannot fully prevent dewing of the lid 9, via cooled air from the refrigerating chamber 2, due to the delayed prevention of an excessively humid condition in the vegetable-storage container 7 caused by the gradual expansion of the moisture-sensitive sheet 12. Similarly due to the delayed prevention of an excessively dry condition in the vegetable-storage container 7 caused by the gradual contraction of the moisture-sensitive sheet 12, the duration of the flow of cooled air from the refrigerating chamber to the vegetable-storage container 7 is prolonged to cause soft vegetables, such as spinach or the like, to incure dried effect.

In addition, since the moisture-sensitive sheet 12 is composed of expansive material, such as polyvinyl alcholic film for example, not only is its responsiveness extremely poor in testing of its absorption and discharge of moisture, but the moisture-sensitive sheet 12 is also apt to lose its elastic characteristic as a result of repeated absorption and discharge of moisture, causing repeated stretching and contracting of the moisture-sensitive sheet 12.

Consequently, the above-proposed refrigerator cannot maintain humidity inside of the vegetable-storage chamber at an optimal degree for a long while, thus failing to store vegetables in fresh condition for a long while.

Accordingly, an object of the invention is to provide a novel refrigerator which can prevent dewing from occurrence by automatically and precisely controlling humidity inside of the vegetable-storage container and store vegetables in fresh condition for a long while by preserving proper humidity suited for vegetables.

SUMMARY OF THE INVENTION

To achieve the above object, the invention provides a novel refrigerator incorporating a refrigerating chamber and a vegetable-storage container subject to cooling by effect of cooling air from the refrigerating chamber, wherein the vegetable-storage container and/or the lid of said container is provided with a moisture-permeable film incorporating a shape-memory resin layer.

By virtue of provision of the above structural components for the inventive refrigerator, moisture permeability of the moisture-permeable film automatically and quickly varies in the vicinity of glass transition point of the shape-memory resin in a temperature zone ranging from 0° C. to 100° C. for example. More particularly, a greater volume of moisture is permeable through the moisture-permeable film in such a case in which temperature inside of the vegetable-storage container rises immediately after storing vegetables or tepid beer or juice, therein to result in the activated respiration and humid-vapor emission of vegetables. Conversely, less volume of moisture is permeable through said film in such a case in which temperature inside of the vegetable-storage container is stabilized at a low degree or in such a case in which less volume of moisture is emitted from a less amount of vegetables stored therein. Accordingly, the inventive refrigerator can always maintain the interior of the vegetable-storage container at a high humidity level suited for vegetables while preventing dewing symptom from occurrence therein.

It is desired that the moisture-permeable film be disposed to the aperture portion of the vegetable-storage container.

The inventive refrigerator providing the moisture-permeable film for the aperture portion of the vegetable-storage container comprises a refrigerating apparatus, a vegetable-storage container having an open top surface, and a lid member which is disposed in close contact with the container by way of covering top surface thereof and incorporates moisture-permeable films containing a shape-memory resin layer.

It is desired that the moisture-permeable film be disposed to such a location in which dewing symptom is apt to be generated.

The invention according to this standpoint comprises a refrigerating chamber and a vegetable-storage container subject to cooling via cooled air from the refrigerating chamber, wherein moisture-permeable films incorporating a shape-memory resin layer is set to the back surface of the vegetable-storage container.

In another aspect of the inventive structure having the vegetable-storage container, a cutout portion is formed at upper portion of the back surface of the vegetable-storage container to accommodate a fruit container therein. It is desired that moisture-permeable films incorporating a shape-memory resin layer be formed on the back surface of the fruit container.

More effect can be generated by providing bottom surface of the fruit container with a plurality of through-holes each having an optional dimension.

Since the invention provides a fruit container in cutout portion on the upper back surface of the vegetable-storage container and the moisture-permeable films on the back surface of the fruit container, the back surface of the fruit container can more effectively be prevented from dewing symptom so that no water can be generated from dew inside of the fruit container. In addition, by providing bottom surface of the fruit container with a plurality of through-holes each having an optional dimension, dewing symptom can be prevented from being generated on external bottom surface of the fruit container.

The invention for achieving the same object as was described above provides a novel refrigerator comprising a refrigerating apparatus, a vegetable-storage container having an open top surface, and a lid member in close contact with said container by way of covering the top surface thereof, wherein moisture-permeable films incorporating a shape-memory resin layer is integrally formed in part of the lid member.

By virtue of integral formation of the moisture-permeable films at aperture portion of the lid member, the number of component parts and production cost can respectively be decreased.

In contrast with this structure, it is also allowable for the invention to provide the aperture portion of the lid member with a discrete lattice-form member integrally accommodating the moisture-permeable films incorporating a shape-memory resin layer therein.

By virtue of provision of a discrete lattice-form member integrally accommodating the moisture-permeable films at aperture portion of the lid member, the moisture-permeable films can be replaced at a low cost.

The moisture-permeable film may be composed of humid-vapor permeable basic cloth and hydrophilic shape-memory resin.

Likewise, the moisture-permeable film may also be composed of a shape-memory resin film comprising a hydrophilic shape-memory resin and a hydrophobic shape-memory resin being mixed under a predetermined blend ratio in combination with a humid-vapor permeable basic cloth.

By virtue of mixing hydrophilic and hydrophobic shape-memory resin with each other under a predetermined blend ratio, humid-permeability of the moisture-permeable film can be adjusted.

It is desired that the moisture-permeable film be composed of a humid-vapor permeable basic cloth incorporating a heat-insulation layer and a hydrophilic shape-memory resin film, wherein basic cloth of the moisture-permeable film should desirably be secured to external-surface side of the lid member, whereas the shape-memory resin film should desirably be secured to internal-surface side thereof.

According to the invention, the shape-memory resin film of the moisture-permeable film is disposed to the internal surface of the vegetable storage container, and consequently, humid-permeability can quickly be varied in response to variable temperature and humidity inside of the vegetable storage container.

According to the invention, a heat-insulation layer is formed on external surface of the moisture-permeable film. This prevents the moisture-permeable film from sensitively catching temperature and humidity of dry and cooled air flowing outside of the vegetable storage container, and thus, it is possible to quickly sense such humidity suited for vegetables so that variation of humid-permeability in correspondence with temperature and humidity inside of the vegetable storage container can be set forth.

It is recommended in regard to formation of a heat-insulation layer in the above structure that a basic cloth be composed of double layers or more than double layers of laminated woven or non-woven cloth to provide the basic cloth with heat-insulating property. It is also recommended as another method of forming the basic cloth that the basic cloth be composed of two or more than double cloth materials, more particularly, a heat-insulation layer is built in the basic cloth by way of forming air-layer between double cloth materials via spacers interposed therebetween.

It is desired that thermal conductive coefficient of the heat-insulation layer be equivalent to that of side wall surface of the vegetable-storage container.

By virtue of provision of a heat-insulation layer exerting heat-insulating property substantially corresponding to heat-insulation coefficient of side wall surface of the vegetable storage container, temperature in the periphery of the moisture-permeable film can be prevented from extremely being lowered to make it possible to level off temperature and humidity inside of the vegetable-storage container, thus effectively preserving freshness of vegetables stored therein.

It is desired that a protective basic cloth be set to inner surface of the shape-memory resin film, and yet, heat-insulation coefficient of the basic cloth provided with a heat-insulation layer on outer surface of the vegetable storage container be greater than that of the protective cloth.

The shape-memory resin for forming the moisture-permeable film may consist of polyurethane resin, whereas the basic cloth may be composed of a woven or non-woven cloth made from nylon or polyester resin for example.

The basic cloth can be laminated with the shape-memory resin via adhesion of said resin onto the basic cloth.

It is desired that adhesion of the moisture-permeable film be effected via adhesive layers comprising the basic cloth and the shape-memory resin interspersed at proper intervals. According to this structure, the shape-memory resin can be reinforced without substantially lowering humid-permeability.

It is desired that surface of the shape-memory resin of the moisture-permeable film be arranged so that said surface can be set to inner side of the vegetable-storage container.

By arranging the hydrophilic shape-memory resin surface of the moisture-permeable film to the inner side of the vegetable storage container, humid-permeability-can quickly be varied in response to varied temperature and humidity inside of the vegetable storage container.

Introduction of such a structure in which both surfaces of the shape-memory resin are respectively pinched by humid-vapor permeable basic cloths leads to the enhanced strength such as abrasion resistivity more over.

When treating the basic cloths with water-repellent finish, the basic cloths can be prevented from being stained, and yet, humid-permeability of the moisture-permeable film can stably be preserved.

The humid-permeable film may also be composed of humid-vapor permeable fibers and shape-memory resin. In this case, it is recommended that polyurethane resin be used for the shape-memory resin, whereas available fibers consist of nylon or polyester fibers for combination with said resin.

When implementing the above structure, it is enough to have at least one side of fibers to be coated with the shape-memory resin.

It is also allowable for the invention to effect coating solely onto specific part of fibers with the shape-memory resin.

By virtue of forming moisture-permeable film via coating of specific part of fibers with the shape-memory resin, it is possible to simply and freely form such moisture-permeable films each having different humid-permeability. Accordingly, the moisture-permeable films can be used for a wide variety of refrigerators.

It is also allowable for the invention to provide the moisture-permeable film with a plurality of fine through-holes.

By virtue of providing the moisture-permeable film with a plurality of fine through-holes, the removal of carbonic acid gas or ethylene gas that may be detrimental to vegetables and fruits can be promoted.

If the moisture-permeable film were treated with anti-bacili agent in advance, hygienic condition can securely be preserved for a long period of time.

It is also possible to form air-layer serving as heat-insulation layer merely by adhering a cover sheet onto external surface of the lid member. Since the moisture-permeable film can sensitively deal with temperature inside of the vegetable storage container without directly being affected by dry and cooled air flowing around external surfaces of the vegetable storage container, humid-permeability of the moisture-permeable film variably functions to preserve freshness of vegetables stored therein.

DESCRIPTION OF THE PREFERRED EMBODIMENTS

Referring to the accompanying drawings, optimal forms for embodying the invention are described below.

Figure 1:
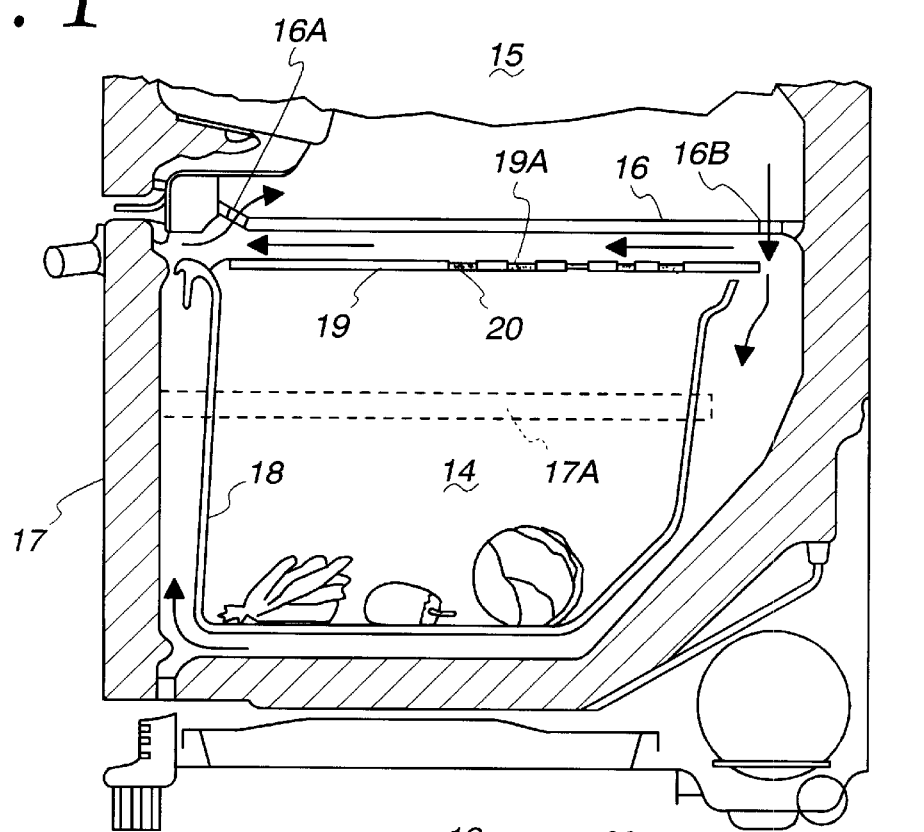
FIG. 1 is a vertical sectional view of the vegetable storage N.E. chamber of a refrigerator according to the first embodiment of the invention.

FIG. 1 is a sectional view of a vegetable storage chamber 14 of the refrigerator according to the invention, in which the vegetable storage chamber 14 is disposed below a refrigerating chamber 15. The vegetable storage chamber 14 is sectioned from the refrigerating chamber 15 via a partitioning board 16. The partitioning board 16 is provided with a pair of air-vents 16a and 16b in the front and on the back thereof so that cooled air from the refrigerating chamber 15 can circularly be fed to the vegetable storage chamber 14 via said air-vents. The flow of air is indicated by arrows in FIG. 1.

The vegetable storage chamber 14 comprises a vegetable storage container 18 which is opened and closed in conjunction with a vegetable chamber door 17 by way of riding on a pair of rails 17a horizontally secured to both sides of the vegetable-chamber door 17, and a lid member 19 which closely covers the top of the vegetable-storage container 18.

Figure 2:
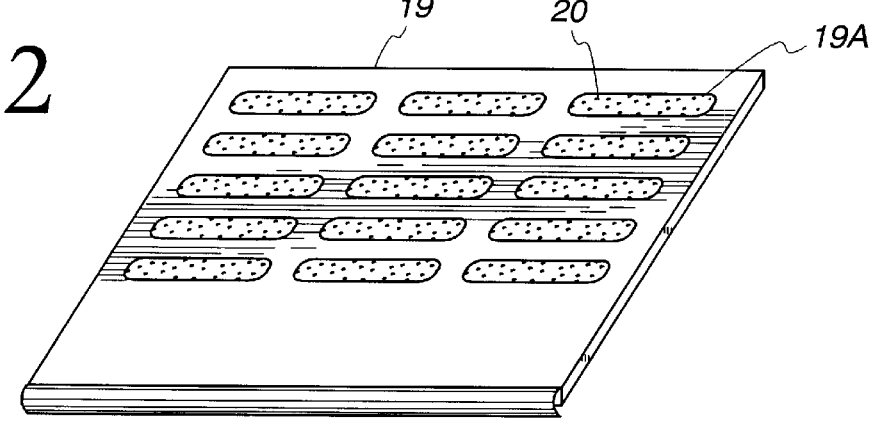
FIG. 2 is a perspective view of the lid member of the vegetable storage chamber of the refrigerator according to the first embodiment of the invention.
Figure 3:
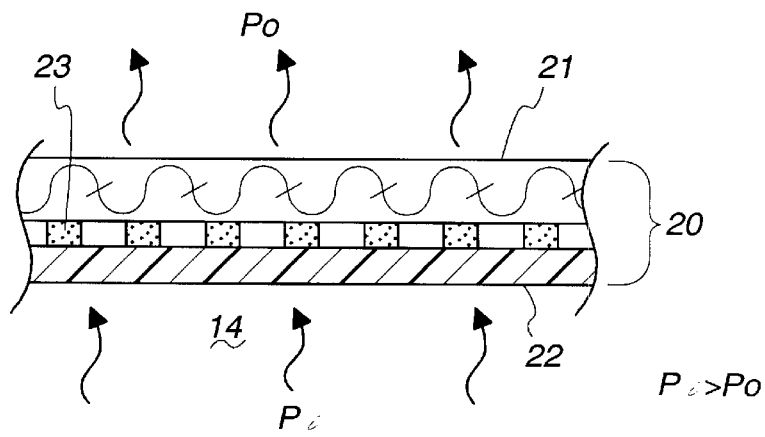
FIG. 3 is a partially enlarged sectional view of the moisture-permeable film according to the first embodiment of the invention.

As is shown in FIG. 2, apertures 19a are formed in the rear portion of lid member 19. The apertures 19a are respectively provided with moisture-permeable films 20 which are integrated with corresponding apertures 19a. As shown in FIG. 3, the moisture-permeable films 20 respectively comprise basic cloths 21, made from nylon, polyester or other similar material, which are respectively adhered to shape-memory resin film 22, made from hydrophilic polyurethane resin or other similar resin, via adhesive layers 23 interspersed at proper intervals.

According to the first embodiment of the invention, the moisture-permeable film 20 is so disposed that the surface of the shape-memory resin film 22 is inside of the vegetable storage container 18.

Figure 4:
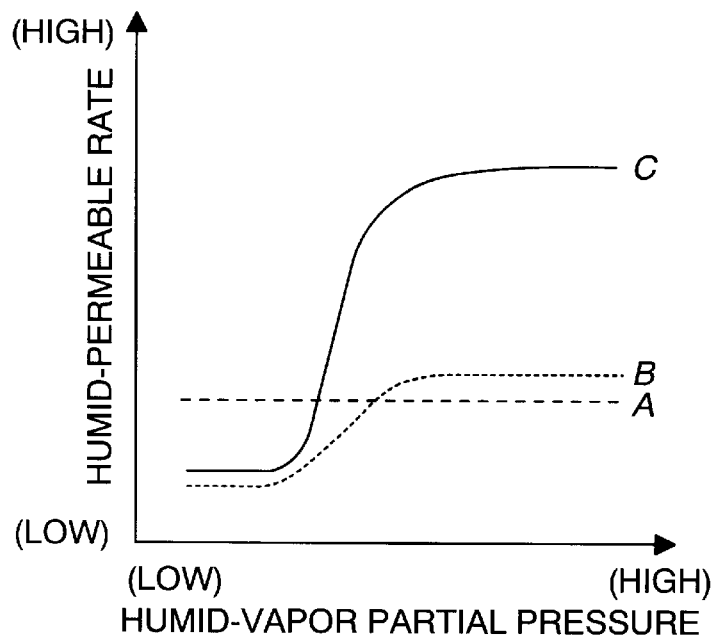
FIG. 4 is a diagram of humid-vapor permeating functions curve C is for the moisture-permeable film according to the first embodiment of the invention curve B is for a moisture-permeable film composed of hydrophobic shape-memory resin, and curve A is for a conventional moisture-permeable film.

Referring now to FIG. 4, the characteristic of humid-vapor permeability of the moisture-permeable film 20 using the shape-memory resin film introduced for the first embodiment is explained below. FIG. 4 represents the relationship between humid-permeability (gram/ m$^2$ per day based on mmHg) of a variety of moisture-permeable films and humid-vapor partial pressure. Curve A shown in FIG. 4 represents the relationship between humid-permeability of conventional moisture-permeable films and humid-vapor partial pressure. Curve B represents the relationship between humid-permeability of a moisture-permeable film composed of hydrophobic shape-memory resin film and humid-vapor partial pressure. Curve C represents the relationship between humid-permeability of the moisture-permeable film 20 composed of hydrophilic shape-memory resin film according to the first embodiment and humid-vapor partial pressure.

As is apparent from FIG. 4, as shown via curve A, even when temperature and humidity rise, humid-permeability of any conventional moisture-permeable film remains substantially constant without change. On the other hand, in the case of such a conventional moisture-permeable film composed of hydrophobic shape-memory resin film, even when elevated temperature exceeds glass transition temperature Tg(in a range from 0° C. to 10° C. for example) as shown via curve B, humid-permeability only slightly rises. In contrast with the above characteristics, as shown via curve C, when elevated temperature exceeds glass transition temperature Tg, hydrophilic shape-memory resin film according to the first embodiment indicates that humid-permeability sharply grows.

Concretely, the above-referred hydrophilic shape-memory resin film 22 contains such physical characteristic causing humid-vapor permeating function to significantly vary whenever temperature exceeds glass transition temperature Tg, and thus, humid-permeability of the moisture-permeable film 20 sharply grows whenever environmental temperature and humidity inside of the vegetable storage container respectively rise to enable the moisture-permeable film 20 to prevent dewing symptom from occurrence therein.

Conversely, whenever environmental temperature and humidity inside of the vegetable storage container respectively lower, humid-permeability of the moisture-permeable film 20 related to the invention sharply decreases to enable the moisture-permeable film 20 to prevent the internal atmosphere of the vegetable storage container from being dried.

This is because, whenever the temperature of the hydrophilic shape-memory resin film 22 is lower than glass transition temperature Tg, clearance between resinous molecules contract to restrain humid-vapor permeability. Conversely, whenever the temperature of the hydrophilic shape-memory resin film 22 is higher than glass transition temperature Tg, noncrystalline molecular movement inside of resin is activated to expand clearance between resinous molecules to facilitate diffusion of humid-vapor molecules, and thus, the hydrophilic shape-memory resin film 22 exerts function to promote humid-vapor permeability.

Since the shape-memory resin film 22 of the moisture permeable film 20 is hydrophilic, substantial volume of humid-vapor molecules dissolves into the shape-memory resin film 22. Consequently, in such a dewing environment in which temperature exceeds glass transition temperature Tg and surface of the shape-memory resin film 22 is wet, because of synergism, humid-permeability sharply rises (Note that principle of shape-memory resin is described in the April 1993 issue of "Trigger").

Referring now to FIG. 1 through FIG. 4, operation of the refrigerator featuring the above structure is described below.

Initially, when vegetables are stored in the above-referred vegetable-storage container 18, because of respiratory function of vegetables, water is emitted from them to cause the interior of the almost tightly closed vegetable-storage container 18 to become highly humid. Immediately after storage of vegetables therein, since vegetables bear high temperature and actively respire themselves to emit substantial volume of water, normally, the interior of the vegetable storage container 18 is excessively humid to cause dewing symptom to be generated very easily on the rear part of the lid member 19.

Nevertheless, whenever temperature and humidity inside of the vegetable-storage container 18 respectively remain high, the moisture permeable film 20 secured to the lid member 19 of the vegetable-storage chamber 14 exerts high humid-vapor permeability. Consequently, as being illustrated in FIG. 3, excessive water inside of the vegetable-storage container 18 shifts from the vegetable-storage chamber 14 containing high humid-vapor partial pressure (Pi) to the refrigerating chamber 15 containing low humid-vapor partial pressure (Po), thus avoiding excessively humid condition to result in the prevention of dewing symptom from occurrence.

After elapsing a certain time from the storage of vegetables, when temperature inside of the vegetable-storage chamber 14 lowers below glass transition temperature Tg (in a range from 0° C. to 10° C. for example) of the said shape-memory resin film 22, humid-vapor permeability of the said moisture-permeable film 20 lowers to such a level at which the interior of the vegetable-storage chamber 14 can be maintained at high humidity (in a range from 80% RH to 95% RH) suited for storage of vegetables. While this condition is present, since respiratory function of vegetables is restrained to result in the decrease of water evaporated therefrom, even though humid-vapor permeability is lowered, dewing symptom can be prevented from occurrence.

When very large volume of vegetables is stored, vegetables generate substantial volume of respiratory heat to cause temperature inside of the vegetable-storage chamber 14 to rise and vegetables to evaporate large volume of water to easily generate dewing symptom. However, even when this condition is present, humid-permeability of the moisture-permeable film 20 grows to function so that dewing symptom can be prevented from occurrence. Conversely, when small volume of vegetables is stored, vegetables generate insubstantial volume of respiratory heat, and thus, temperature inside of the vegetable-storage chamber 14 remains low to cause vegetables to evaporate insubstantial volume of water and tend to be dry. However, while this condition is present, humid-permeability of the moisture-permeable film 20 lowers to function so that vegetables can be prevented from being dried.

Accordingly, since humid-permeability of the moisture-permeable film 20 properly varies in correspondence with varied respiratory volume caused by own temperature of vegetables and the stored volume of vegetables, the moisture-permeable film 20 can more effectively control temperature than that is achievable via conventional moisture-permeable films, and yet, the moisture-permeable film 20 can bilaterally preserve high humidity and prevent dewing symptom from occurrence.

As is apparent from the foregoing description, according to the first embodiment of the invention, the vegetable-storage chamber 14 is almost tightly closed by means of the vegetable-storage container 18 and the lid member 19 having moisture-permeable films 20. As a result of composing the moisture-permeable film 20 with humid-vapor permeable basic cloth 21 and the hydrophilic shape-memory resin film 22, humid-vapor permeability properly varies in correspondence with varied temperature and volume of stored vegetables inside of the vegetable-storage chamber 14, and thus, the inventive refrigerator can preserve high humidity suited for vegetables while preventing dewing symptom from occurrence. In consequence, the inventive refrigerator can properly store vegetables for a longer period of time than any conventional refrigerator. The moisture-permeable film 20 does not mechanically deform itself, but it can preserve own humid-vapor permeable characteristic for a long period of time, and thus, it is more durable than any of conventional moisture-permeable films.

According to the structure proposed for the first embodiment, the moisture-permeable film 20 adhered with the basic cloth 21 and the shape-memory resin film 22 is integrally formed on the aperture 19a of the lid member 19, and thus, it is possible to constantly preserve own strength of the moisture-permeable film 20 and decrease the number of component parts and production cost.

Because of very thin thickness (ranging from a few microns to scores of microns), generally, the shape-memory resin film 22 is fragile when solely being applied, and thus, it is impossible to execute integral molding. On the other hand, since the first embodiment has introduced such a structure in which the shape-memory resin film 22 has been laminated onto the basic cloth 21, overall strength has been enhanced to make it possible to execute integral molding.

In the structure of the inventive refrigerator based on the first embodiment,since the moisture-permeable film 20 comprises a basic cloth 21 adhered with a the shape-memory resin film 22 via adhesive layers interspersed at proper intervals,the shape-memory resin film 22 can be reinforced without substantially lowering humid-permeability.

In the structure of the inventive refrigerator based on the first embodiment, surface of the hydrophilic shape-memory resin film 22 of the moisture-permeable film 20 has been so arranged that said surface can be inside of the vegetable-storage container 18, humid-permeability can quickly be varied in correspondence with varied temperature and humidity inside of the vegetable-storage container 18.

The Second Embodiment

Figure 5:
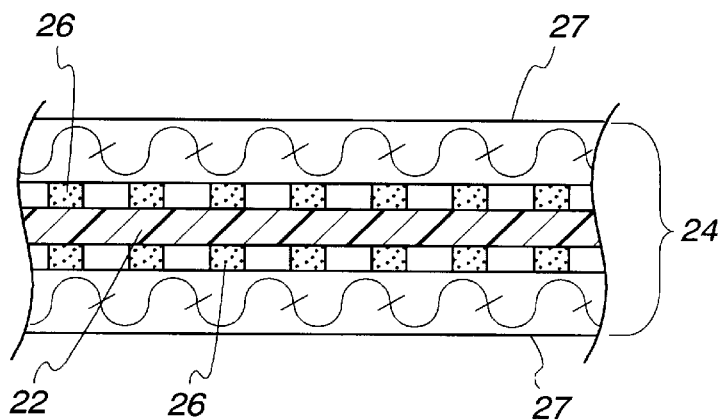
FIG. 5 is a partially enlarged sectional view of the moisture-permeable film according to a second embodiment of the invention.

Referring now to FIG. 5, the second embodiment of the invention is described below. It should be understood that only the structure of the moisture-permeable film in the following second through eighth embodiments is different from that of the first embodiment. Structure and other details of the vegetable-storage chamber are identical to those which have been described above. Accordingly, only the composition of moisture-permeable film is described below.

FIG. 5 represents cross-section of the moisture-permeable film 24 used for implementing the second embodiment of the invention. A pair of basic cloths 27 composed of woven or non-woven cloth such as nylon or polyester are bonded onto both surfaces of the shape-memory resin film 22 via adhesive layers 26 interspersed at proper intervals. The shape-memory resin film 22 is made from such materials identical to the one used for implementing the first embodiment.

As was just described above, since both surfaces of the shape-memory resin film 22 are protected by the basic cloths 27 in the structure of the second embodiment, the shape-memory resin film 22 is further reinforced.

Insofar as the basic cloths 27 bonded onto both surfaces of the resin film 22 are humid-permeable, the basic cloths 27 may be composed of such a material exactly identical to each other or may not be of the identical one. Although not being illustrated, it is also possible to superpose the basic cloths 27 on both surfaces of the shape-memory resin film 22 without interposing the adhesive layer 26 followed by a process to effect adhesion of peripheral edges thereof or secure them to each other with discretely available molded resinous parts.

The Third Embodiment

Figure 6:
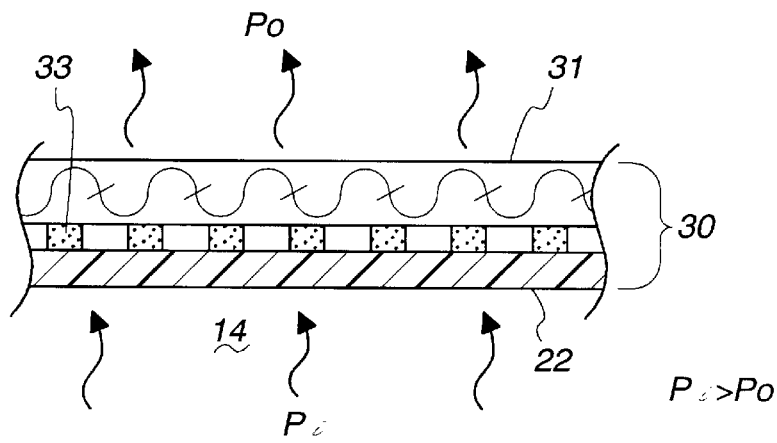
FIG. 6 is a partially enlarged sectional view of the moisture-permeable film according to a third embodiment of the invention.

Referring now to FIG. 6, the third embodiment of the invention is described below. As being illustrated in FIG. 6, in the structure of the inventive refrigerator according to the third embodiment, the moisture-permeable film 30 is formed by adhering the shape-memory resin film 22 to a basic cloth 31 composed of nylon or polyester via adhesive layers 33 interspersed at proper intervals, where the shape-memory resin film 22 is produced by blending hydrophilic shape-memory resin such as polyurethane resin with hydrophobic shape-memory resin based on a predetermined blend ratio. More particularly, in contrast with the first and second embodiments which have respectively introduced hydrophilic polyurethane-resin-based shape-memory resin for composing shape-memory resin film of moisture-permeable film, the third embodiment introduces such resinous material composed of hydrophilic polyurethane-resin-based shape-memory resin and hydrophobic shape-memory resin being blended with each other based on a predetermined blend ratio.

Unlike the preceding embodiments, the third embodiment makes use of such resinous material composed of hydrophilic polyurethane-resin-based shape-memory resin and hydrophobic shape-memory resin formulated under a predetermined blend ratio, and thus, humid vapor permeability of the moisture-permeable film 30 significantly differs from that of the moisture-permeable films 20 and 24 used for the preceding embodiments.

Figure 7:
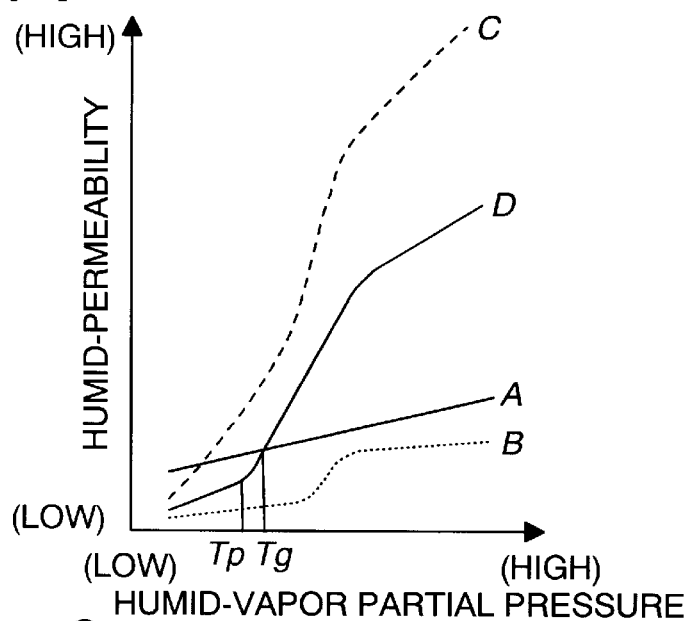
FIG. 7 is a diagram of humid-vapor permeating functions; curve D is for the moisture-permeable film according to the third embodiment of the invention curve C is for a moisture-permeable film composed of hydrophilic shape-memory resin, curve B is for a moisture-permeable film composed of hydrophobic shape-memory resin, and curve A is for a conventional moisture-permeable film.

Next, referring to FIG. 7, characteristic of humid-vapor permeability of the moisture-permeable film 30 used for implementing the third embodiment is described below. FIG. 7 graphically illustrates the relationship between humid-permeability (grams/m² per day based on mmHg) of a variety of moisture-permeable films and humid-vapor partial pressure confirmed via an experiment.

In FIG. 7, curve A represents the relationship between humid-permeability of a conventional moisture-permeable film and humid-vapor partial pressure. Curve B represents characteristic of a moisture-permeable film composed of hydrophobic shape-memory resin film. Curve C represents characteristic of a moisture-permeable film composed of hydrophilic shape-memory resin film. Curve D represents characteristic of the moisture-permeable film 30 composed of shape-memory resin film formed via blending of hydrophilic shape-memory resin and hydrophobic shape-memory resin under a predetermined blend ratio by way of implementing the third embodiment.

Concretely, the curve A observed from a conventional moisture-permeable film indicates that humid-permeability does not significantly vary even when temperature and humidity rise. On the other hand, as was described earlier in relation to the first embodiment, the moisture-permeable film composed of shape-memory resin film contains such characteristic in which humid-permeability sharply grows whenever temperature exceeds temperature Tp (in a range from 5° C. to 10° C. for example) being lower than glass transition temperature Tg by approximately 15° C.

Nevertheless, variable degree of humid-permeability differs from each other in the above-referred curves. Concretely, when temperature exceeds said Tp, humid-permeability of the curve B (shown by hydrophobic shape-memory resin) sharply grows without outgrowing humid-permeability of the curve A. On the other hand, humid-permeability of the curve C (shown by a conventional hydrophilic shape-memory resin) is excessively high in the low-temperature range, and yet, humid-permeability of the curve C is constantly higher than any conventional moisture-permeable film.

On the other hand, the curve D shown by the shape-memory resin used for implementing the third embodiment indicates that humid-permeability of the curve D is less than that of the curve A in the low-temperature range, where humid-permeability of the curve D sharply grows at the Tp temperature point, whereas humid-permeability of the curve D inversely turns at the Tg temperature point and outgrows that of the curve A in the high temperature range.

Figure 8:
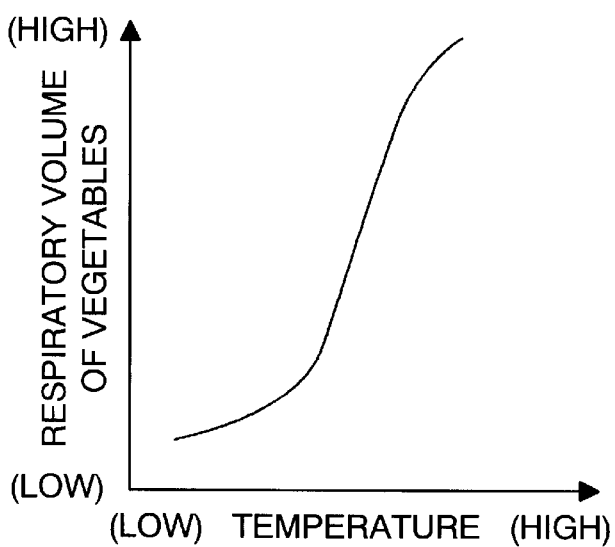
FIG. 8 is a diagram of the relationship between respiratory volume of vegetables versus temperature.

As shown in FIG. 8, generally, respiratory volume of vegetables is insubstantial in the low-temperature range, whereas vegetables generate substantial respiratory volume in the high-temperature range. In particular, whenever temperature exceeds a certain degree, for example, when spinach bears about 10° C. of own temperature, respiratory volume sharply increases to generate evaporation of large volume of water.

More particularly, as is clear from comparison between FIG. 7 and FIG. 8, the moisture-permeable film 30 composed of the shape-memory resin film 22 can vary own humid-permeability in response to varied respiratory volume of vegetables, and thus, as soon as environment inside of the vegetable container bears high degree of temperature and humidity, humid-permeability sharply rises to prevent dewing symptom from occurrence, and yet, whenever temperature and humidity lower inside of the vegetable container, humid-permeability sharply lowers to prevent atmosphere inside of the vegetable container from being dried.

Concretely, in the case of the moisture-permeable film 30 used for implementing the third embodiment, since the shape-memory resin film 22 is properly hydrophilic, adequately substantial volume of humid-vapor molecules dissolve into the shape-memory resin film, thus generating synergism.

It is conceived that deviation between the above-referred temperature range Tg and Tp is generated because of a certain width of temperature present in glass transition zone of shape-memory resin.

The Fourth Embodiment

Next, referring to FIG. 9, the fourth embodiment of the invention is described below. Since the fourth embodiment makes difference from the third embodiment solely in the composition of moisture-permeable film while preserving identical structure of vegetable-storage chamber, only the composition of the moisture-permeable film is described below.

Figure 9:
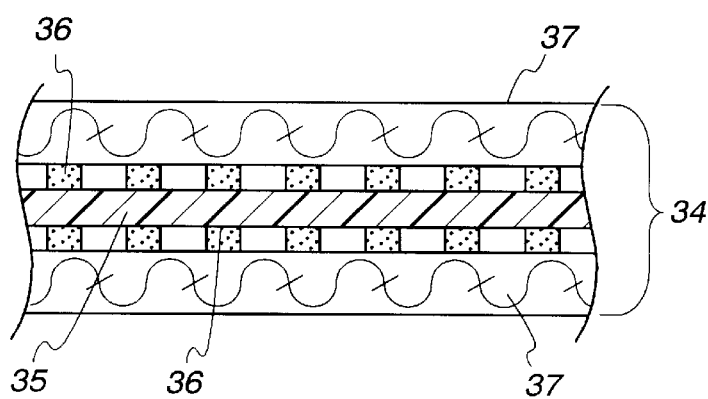
FIG. 9 is a partially enlarged sectional view of the moisture-permeable film according to a fourth embodiment of the invention.

FIG. 9 illustrates cross-section of the moisture-permeable film 34 used for implementing the fourth embodiment of the invention. A pair of basic cloths 37 composed of woven or non-woven cloth made from nylon or polyester are bonded on both surfaces of the shape-memory resin film 35 via a plurality of adhesive layers 36 interspersed at proper intervals. The shape-memory resin film 35 is composed of such a shape-memory resin film produced by blending hydrophilic polyurethane shape-memory resin as was used for implementing the third embodiment and hydrophobic shape-memory resin based on a predetermined blend ratio.

The basic cloths 37 are respectively treated with water-repellent finish by applying fluoro carbon resin or silicone resin for example.

Unlike the third embodiment, both surfaces of the shape-memory resin film 35 of the moisture-permeable film 34 used for implementing the fourth embodiment are respectively protected by the basic cloths 37, and thus, the shape-memory resin film 35 can securely be prevented from incurring breakage.

In addition, since the basic cloths 37 are respectively water repellent, they can be prevented from being stained by dropped food juice, and yet, humid-permeability of the moisture-permeable film 34 can stably be maintained.

Insofar as the basic cloths 37 bonded onto both surfaces of the shape-memory resin film 35 are humid-permeable, the basic cloths 37 may be composed of such a material exactly identical to each other or may not of the the identical one. Although not being illustrated, it is also possible to superpose the basic cloths 37 on both surfaces of the shape-memory resin film 35 without interposing the adhesive layer 36 followed by a process to effect adhesion of peripheral edges thereof or secure them to each other with discretely available molded resinous parts.

The Fifth Embodiment

Next, referring to FIG. 10, the fifth embodiment of the invention is described below. The fifth embodiment makes difference from the fourth embodiment solely in the composition of moisture-permeable film while preserving identical structure of vegetable-storage chamber, and thus, only the composition of the moisture-permeable film is described below. The moisture-permeable film for implementing the fifth embodiment uses a hydrophilic shape-memory resin film.

Figure 10:
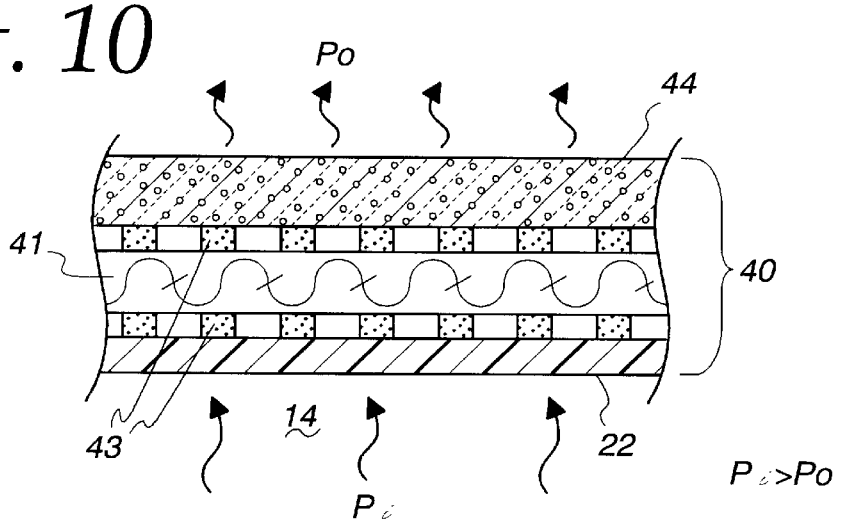
FIG. 10 is a partially enlarged sectional view of the moisture-permeable film according to a fifth embodiment of the invention.

FIG. 10 illustrates cross-section of the moisture-permeable film 40 used for implementing the fifth embodiment of the invention.

As shown in FIG. 10, the moisture-permeable film 40 comprises a basic cloth 41 made from nylon or polyester adhered with a hydrophilic polyurethane shape-memory resin film 22 via adhesive layers 43 interspersed at proper intervals. One surface of the basic cloth 41 used for the fifth embodiment is adhered with a heat-insulation layer 44 made of woven or non-woven cloth exerting high humid-permeability and thermal-insulation effect via the adhesive layers 43.

According to the fifth embodiment, surface of the shape-memory resin film 22 of the moisture-permeable film 40 is so arranged that said surface face inside of the vegetable-storage container 18.

Characteristic of humid-vapor permeability of the moisture-permeable film 40 using the shape-memory resin film 22 used for implementing the fifth embodiment is substantially analogous to the one shown in FIG. 4. Concretely, whenever environment inside of the vegetable storage container 18 bears high temperature and humidity, humid-permeability sharply grows to function so that dewing symptom can be prevented from occurrence therein, and conversely, whenever environment inside of the vegetable container 18 bears low temperature and humidity, humid-permeability sharply decreases to function so that internal environment can be prevented from being dried.

According to the structure for implementing the fifth embodiment, the moisture-permeable film 40 is composed of the basic cloth 41 adhered with the humid-vapor-permeable heat-insulation layer 44 by way of disposing the basic cloth 41 on the external surface and the hydrophilic shape-memory resin film 22 disposed by way of facing internal surface. By virtue of this arrangement, humid vapor permeability of the moisture-permeable film 40 properly varies in correspondence with varied temperature and stored volume of vegetables inside of the vegetable-storage chamber 14 to make it possible to maintain high degree of humidity suited for vegetables while preventing dewing symptom from being generated therein, and thus, vegetables can be stored in fresh condition for a longer period of time than the case of storage in any conventional refrigerator.

Sixth Embodiment

Next, referring to FIG. 11, the sixth embodiment of the invention is described below. The sixth embodiment makes difference from the fifth embodiment solely in the composition of moisture-permeable film while preserving identical structure of vegetable storage chamber, and thus, only the composition of the moisture-permeable film is described below.

Figure 11:
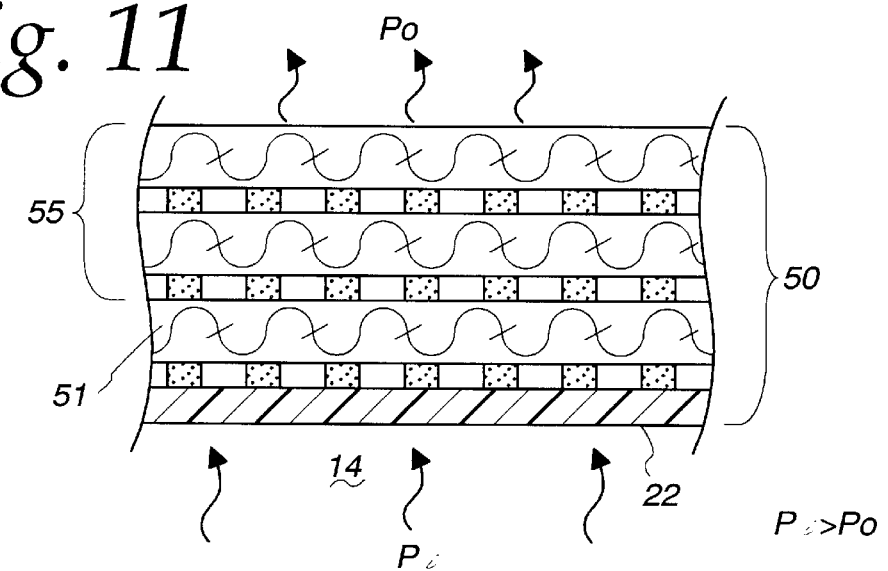
FIG. 11 is a partially enlarged sectional view of the moisture-permeable film according to a sixth embodiment of the invention.

FIG. 11 illustrates cross section of the moisture-permeable film 50 used for implementing the sixth embodiment. By laminating more than double layers of woven cloths or non-woven cloths made from nylon or polyester resin (identical to the one used for the basic cloth 21 of the first embodiment) for integrally functioning as a heat-insulation layer 55, heat-insulation effect is provided for the basic cloths 51.

As was just described above, unlike the fifth embodiment, the moisture-permeable film 50 for implementing the sixth embodiment can easily be provided with predermined heat-insulation effect by laminating more than double layers of nylon or polyester woven or non-woven cloths (identical to that was used for the basic cloth 21 of the first embodiment) for integrally functioning as the heat-insulation layer 55, and yet, composition of the moisture-permeable film 50 is suited for mass production. Thermal conductive coefficient of the heat-insulation layer 55 is arranged to be equivalent to that of side-wall surfaces of the vegetable-container 18, and thus, even when humid-vapor partial pressure inside of the vegetable-storage container 18 is lowered by locally cooled effect of the moisture-permeable film 5O, humidity inside of the vegetable container 18 can be prevented from being lowered and simultaneously cooling effect inside thereof can properly be maintained.

The Seventh Embodiment

Figure 12:
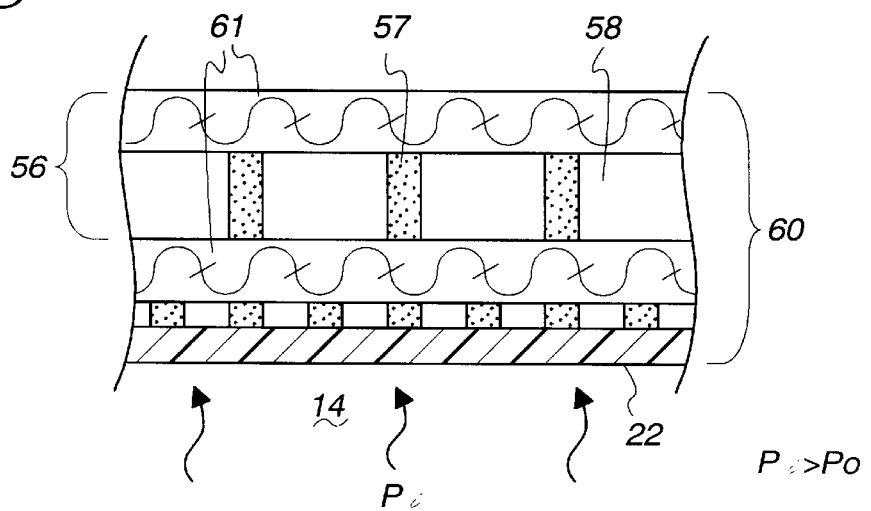
FIG. 12 is a partially enlarged sectional view of the moisture-permeable film according to a seventh embodiment of the invention.

Next, referring to FIG. 12, the seventh embodiment of the invention is described below. The seventh embodiment makes difference from the above embodiment solely in the composition of moisture-permeable film while preserving identical structure of vegetable storage chamber, and thus only the composition of the moisture-permeable film is described above.

The moisture-permeable film 60 according to the seventh embodiment of the invention internally forms air-layers 58 between a pair of upper and lower basic cloths 61 side by side with spacers 57 so that the air-layers 58 can function as the heat-insulation layer 56. Unlike the above embodiment, the inventive refrigerator according to the seventh embodiment internally forms air-layers 58 in conjunction with the spacers 57 to function as the heat-insulation layer 56, thus making it possible to compose heat-insulating moisture-permeable film 60 at inexpensive cost. Since the air-layer 58 which functions as a heat-insulation layer, is formed in the center of the/moisture-permeable film 60 used for the seventh embodiment the moisture-permeable film 60 can quickly respond to the inner temperature of the vegetable-storage container 18 with minimal effect from dry and cooled air circularly flowing around the external periphery of the vegetable-storage container 18. The moisture-permeable film 60 itself exerts heat-insulation effect without obstructing permeation of humid vapor.

The Eighth Embodiment

Figure 13:
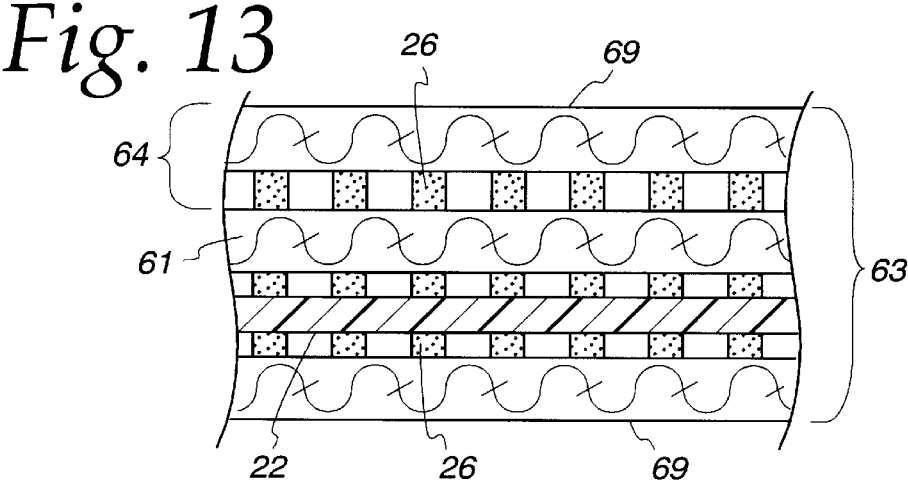
FIG. 13 is a partially enlarged sectional view of the moisture-permeable film according to an eighth embodiment of the invention.

Referring now to FIG. 13, the eighth embodiment of the invention is described below. This embodiment makes difference from the above embodiment solely in the composition of moisture-permeable film while preserving identical structure of vegetable storage chamber, and thus, only the composition of the moisture-permeable film is described by detailing description of the structure of the vegetable storage chamber.

The moisture-permeable film 63 used for implementing the eighth embodiment uses a protective basic cloth 69 below the inner side of the shape-memory resin film 22. It is arranged that thermal-insulation coefficient of the basic cloth 61 is greater than that of the protective basic cloth 69, where the basic cloth 61 is provided with a heat-insulation layer 64 on the outer surface side of the lid member 19 of the vegetable-storage container 18.

Accordingly, unlike the above embodiment, since both surfaces of the shape-memory resin film 22 are protected by the basic cloth 61 and the protective basic cloth 69, the shape-memory resin film 22 can be prevented from incurring breakage. Furthermore, the eighth embodiment arranges thermal-insulation coefficient of the outer-side basic cloth 61 having the heat-insulation layer 64 to be greater than that of the protective basic cloth 69. Accordingly, the shape-memory resin film 22 can more sharply sense temperature inside of the refrigerator to cause humid-permeability to properly vary in response to actual temperature inside of the vegetable-storage container 18 so that freshness of vegetables can securely be preserved.

Insofar as the basic cloth 61 and the protective basic cloth 69 are humid-permeable, both cloths may be composed of such a material exactly identical to each other or may not be of the identical one. Although not being illustrated, it is also possible to superpose the heat-insulation layer 64, the basic cloth 61, and the protective basic cloth 69 on both surfaces of the shape-memory resin film 22 without interposing the adhesive layer 26 therebetween followed by a process to effect adhesion of peripheral edges to secure the shape-memory resin film 22 thereto or secure them to each other with discretely available molded resinous parts.

The Nineth Embodiment

Figure 14:
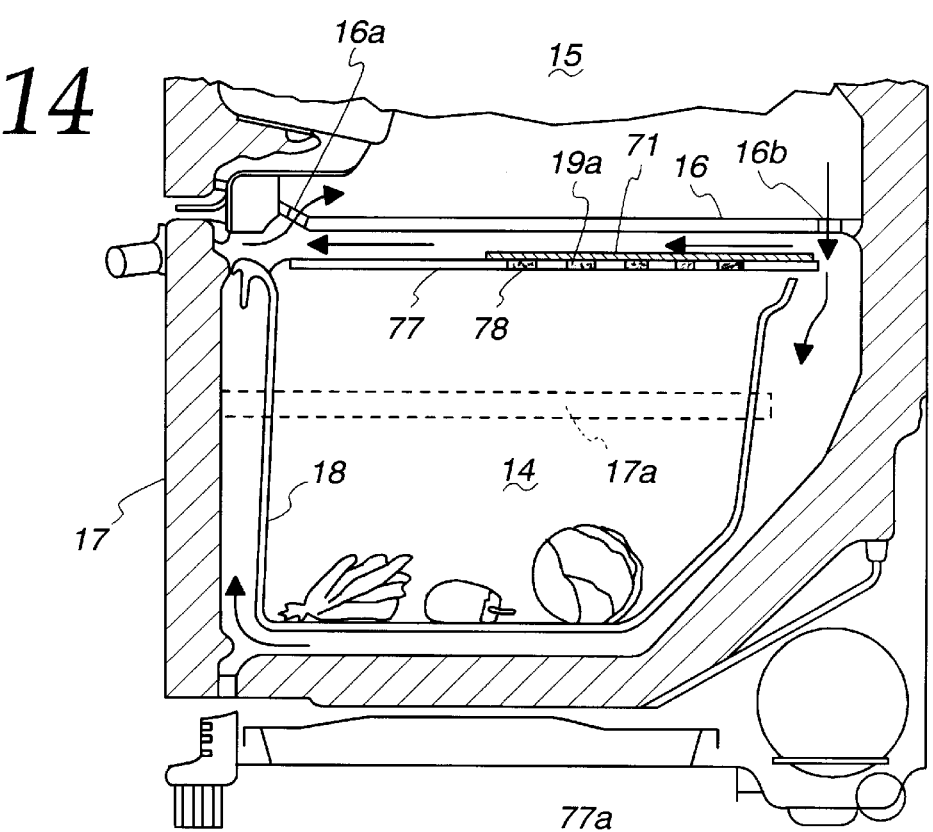
FIG. 14 is a vertical sectional view of a vegetable storage chamber of a refrigerator according to a nineth embodiment of the invention.
Figure 15:
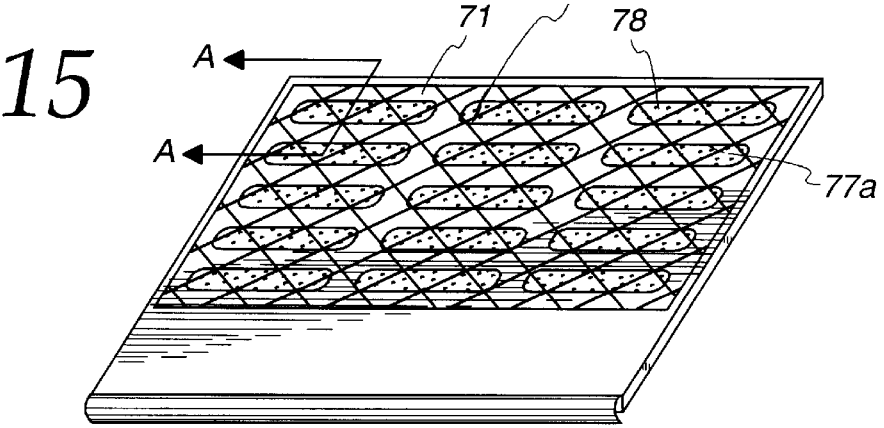
FIG. 15 is a perspective view of the lid member of the vegetable storage chamber of the refrigerator according to the nineth embodiment of the invention.
Figure 16:
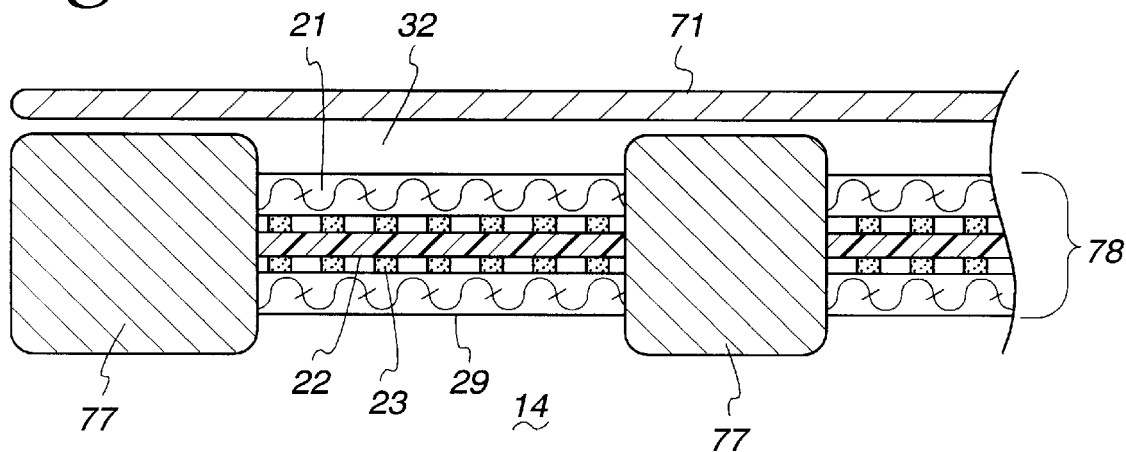
FIG. 16 is a partially enlarged sectional view of the moisture-permeable film across section 16—16 in FIG. 15.

Referring now to FIG. 14 through FIG. 16, the nineth embodiment of the invention is described below. The inventive refrigerator according to the nineth embodiment makes difference from the preceding embodiments in the composition of the lid member 77 and the moisture-permeable film 78 while preserving identical structure of the vegetable storage chamber, and thus, composition of the lid member 77 and the moisture-permeable film 78 is described below by detailing description of the structure of the vegetable-storage chamber.

Like the preceding embodiments, the inventive refrigerator according to the nineth embodiment is provided with a vegetable-storage container 18 having an open top surface, and a lid member 77 provided in close contact with and by way-of-covering open top surface of the vegetable container 18. A moisture-permeable film 78 composed of a humid-vapor permeable basic cloth 21 and a hydrophilic shape-memory resin film 22 is integrally formed in conjunction with an aperture 77a of the lid member 77.

To feature the structure of the nineth embodiment, by way of covering the moisture-permeable film 78, a cover sheet 71 composed of nylon or polyester woven or non-woven cloth (identical to the one used for the basic cloth 21 in the first embodiment) is bonded on external surface of the lid member 77, and yet, an air-layer 32 is formed between the moisture-permeable film 78 and the cover sheet 71.

As was just described above, unlike the first embodiment, although composition of the moisture-permeable film 78 is quite simple because it is merely composed of the humid-vapor permeable basic cloth 21 and the hydrophilic shape-memory resin film 22, since the air-layer 32 functioning as heat-insulation layer is formed merely by adhering the cover sheet 71 to external surface of the lid member 77 availing of projected portion of the integrally formed lid member 77, the moisture-permeable film 78 sharply responds to inner temperature of the vegetable-storage container 18 without directly being affected by dry and cooled air circularly flowing around external periphery of the vegetable-storage container 18, thus causing humid-permeability of the moisture-permeable film 78 to vary to function in order that freshness of stored vegetables can properly be preserved. Insofar as the basic cloth 21, the protective basic cloth 69, and the cover sheet 71, are respectively humid-permeable, they may be composed of the exactly identical material or may not be of the identical one.

The Tenth Embodiment

Figure 17:
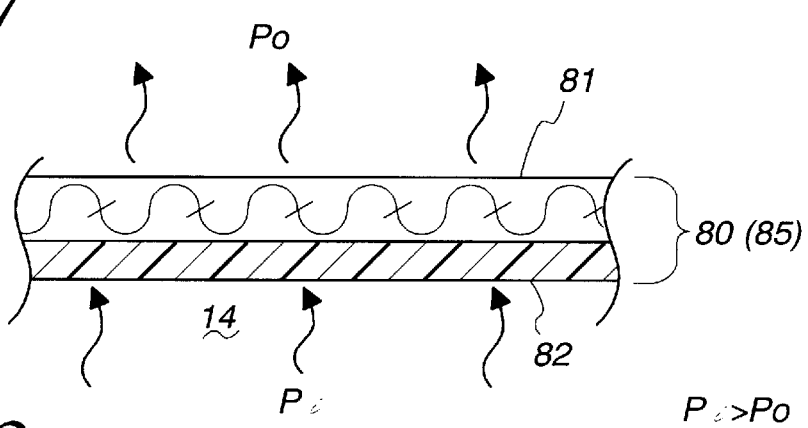
FIG. 17 is a partially enlarged sectional view of the moisture-permeable film according to a tenth embodiment of the invention.

Referring now to FIG. 17, the tenth embodiment of the invention is described below.

In the preceding embodiments, every moisture-permeable film is composed of a laminate in which the shape-memory resin film 22 is superposed on the corresponding basic cloth. However, as shown in FIG. 17, the tenth embodiment introduces a textile 81 in place of a basic cloth in order that the textile 81 can be coated with shape-memory resin 82.

More particularly, when implementing the tenth embodiment, the moisture-permeable film 80 is composed of a textile made from nylon or polyester resin coated with shape-memory resin 82 such as polyurethane resin or the like.

Figure 18:
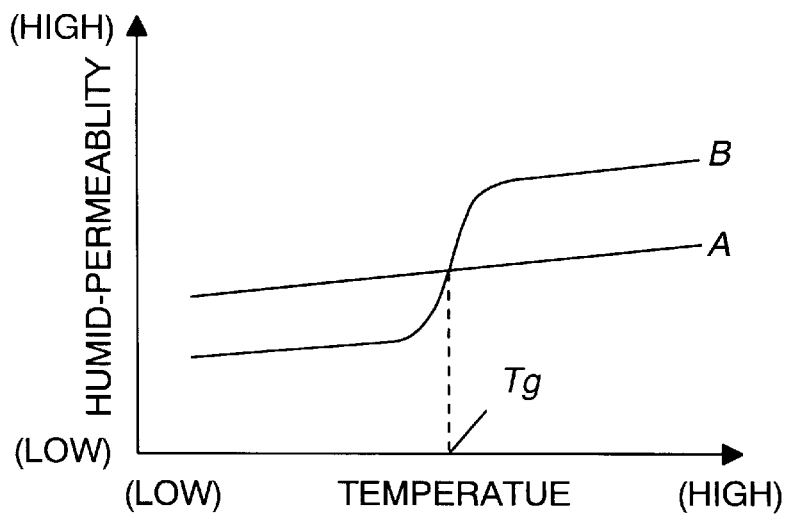
FIG. 18 is an a diagram of humid-vapor permeating functions curve B is for the moisture-permeable film according to the tenth embodiment of the invention, and curve a is for a conventional moisture-permeable film.

Referring now to FIG. 18, characteristic of the shape-memory resin 82 is described below. In FIG. 18, curve A represents the relationship between humid-permeability of a conventional moisture-permeable film and temperature. Curve B represents the relationship between humid-permeability of the moisture-permeable film 80 provided with the inventive shape-memory resin characteristic and temperature. Even when temperature rises as shown in curve A, humid-permeability of the conventional moisture-permeable film does not significantly grow. On the other hand, as was proven by curve B, whenever temperature exceeds glass transition point Tg (in a range from 10° C. to 15° C. for example), humid-permeability of the inventive moisture-permeable film 80 sharply grows.

The Eleventh Embodiment

Figure 19:
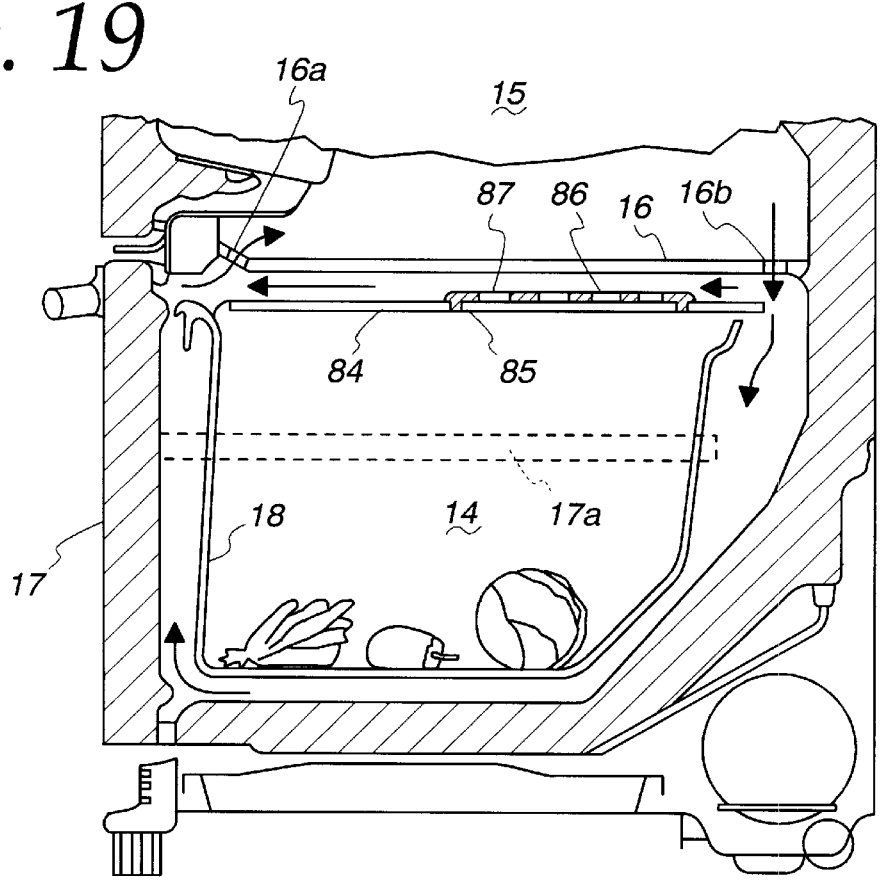
FIG. 19 is a vertical sectional view of a vegetable storage chamber of a refrigerator according to an eleventh embodiment of the invention.

Referring now to FIG. 19, the eleventh embodiment of the invention is described below. The eleventh embodiment is characterized by the form of the moisture-permeable film 85. To simplify the description, component parts identical to those used for the first embodiment are designated by identical reference numerals.

FIG. 19 illustrates a vertical sectional view of the vegetable storage chamber 14 of the refrigerator according to the eleventh embodiment of the invention. The vegetable storage chamber 14 is provided with a discrete component parts 87 having a lattice-form aperture portion 86, where the discrete parts 87 is integrated with the shape-memory resin moisture-permeable film 85 in conjunction with the lid member 84. Composition of the moisture-permeable film 85 is identical to that was used for the tenth embodiment. As shown in FIG. 17, textile 81 coated with shape-memory resin 82 is introduced. The moisture-permeable film 85 exerts own humid-vapor permeable characteristic as per FIG. 18.

As was just described above, since the refrigerator according to the eleventh embodiment uses the shape-memory resin moisture-permeable film 85 as discretely formable parts against the lid member 84, even when the moisture-permeable film 85 incurs unexpected damage, the parts can easily be replaced at a low cost. Instead of integral formation, the moisture-permeable film 85 may be sandwiched by a pair of lattice-form molded parts.

The Twelfth Embodiment

Figure 20:
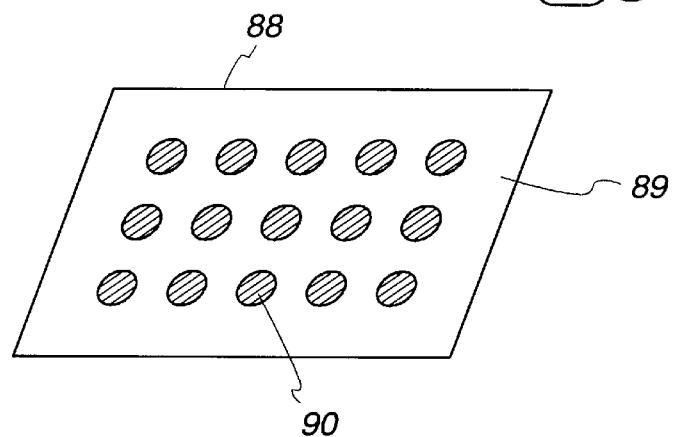
FIG. 20 is a perspective view of the moisture-permeable film according to a twelfth embodiment of the invention.
Figure 21:
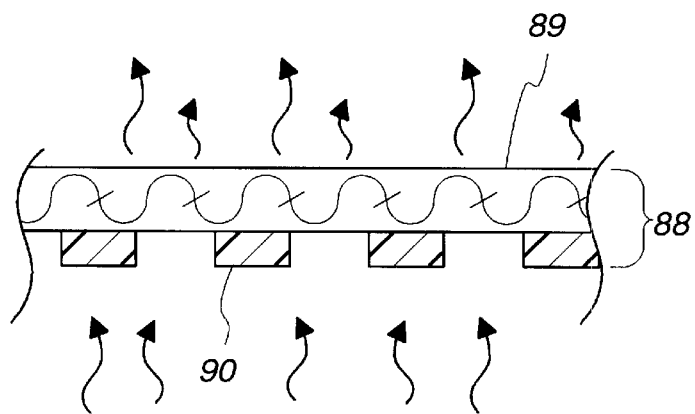
FIG. 21 is a partially enlarged sectional view of the moisture-permeable film according to the twelfth embodiment of the invention.

Referring now to FIG. 20 and FIG. 21, the twelfth embodiment of the invention is described below. The twelfth embodiment makes difference from the tenth and eleventh embodiments solely in the composition of moisture-permeable film while preserving structure of vegetable storage chamber, and thus, only the composition of the moisture-permeable film is described below.

FIG. 20 illustrates composition of the moisture-permeable film 88 for implementing the twelfth embodiment of the invention. Surface of a textile 89 made from nylon or polyester is locally coated with shape-memory resin 90 in dotted form on predetermined area by a few microns through scores of microns of thickness. Accordingly, as being illustrated in FIG. 21, whenever temperature exceeds the above-referred glass transition temperature point Tg, humid-vapor permeability significantly varies only in the local portions coated with the shape-memory resin 90. The remaining portions free of coating with the shape-memory resin 90 preserve substantial humid-permeability proper to the textile 89 independent of the glass transition temperature point Tg.

As was just described above, unlike the preceding embodiments, surface of the textile 89 is locally coated with the shape-memory resin 90 in dotted form on predetermined area by a few microns through scores of microns of thickness, and thus, by merely shifting area subject to resin-coating, humid-permeability of the whole of the moisture-permeable film 88 can freely be varied while preserving such characteristic causing humid-vapor permeability to significantly vary whenever temperature exceeds glass transition temperature point Tg. Accordingly, the moisture-permeable film 88 can usefully be applied to refrigerators having a wide variety of storage capacity.

Not only circular dots shown in FIG. 20, but square or triangular dots may also be used for reception of coating with the shape-memory resin 90. In addition, not only the local coating of dotted area with said resin 90, but it is also allowable to effect plain coating on predetermined portions of the moisture-permeable film 88. For example, only the predetermined portion of the moisture-permeable film 88 may be coated with the shape-memory resin 88 except for such a local portion where dewing symptom can easily take place under constant exposure to cooled air because of structure of the vegetable-storage chamber. By virtue of effecting the above method, dewing symptom can more securely be prevented from occurrence.

The Thirteenth Embodiment

Figure 22:
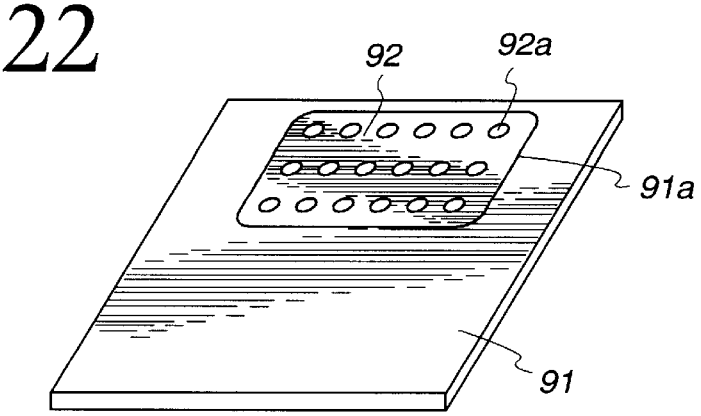
FIG. 22 is a perspective view of the lid member of a vegetable-storage chamber according to a thirteenth embodiment of the invention.
Figure 23:
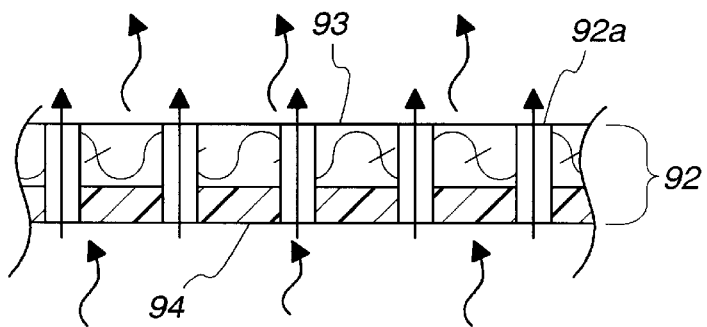
FIG. 23 is a partially enlarged sectional view of the moisture-permeable film according to a fourteenth embodiment of the invention.

Referring now to FIG. 22 and FIG. 23, the thirteenth embodiment of the invention is described below. The thirteenth embodiment makes difference from the tenth, eleventh, and twelfth embodiments solely in composition of moisture-permeable film while preserving identical structure of vegetable-storage chamber, and thus, only the composition of the moisture-permeable film is described below.

FIG. 22 is a perspective view of the lid member 91 set to the vegetable-storage chamber according to the thirteenth embodiment of the invention. The aperture 91a of the lid member 91 is provided with the moisture-permeable film 92. Like the tenth and eleventh embodiments, in the moisture-permeable film 92, single surface of a textile 93 made from nylon or polyester is coated with shape-memory resin 94 such as polyurethane or the like. However, the moisture-permeable film 92 makes difference from the preceding moisture-permeable films solely in the provision of a plurality of fine through-holes 92a. These fine through-holes 92a may be formed subsequent to coating of the textile surface with the shape-memory resin 94 or the coating process may be executed following formation of the fine through-holes 92a.

Since the moisture-permeable film 92 is provided with the fine through-holes 92a, as shown in FIG. 23, those portions through which gas and humid vapor are freely permeable and those portions in which humid-permeability is variable across the above-referred glass transition temperature point Tg of the shape-memory resin 94 are interspersed. Accordingly, the refrigerator according to the thirteenth embodiment of the invention is distinguished in prevention of dewing symptom from occurrence, and yet, the novel moisture-permeable film 92 enhances practical effect in removal of carbon acid gas and ethylene gas which are apt to be filled in the closed-type vegetable-storage chamber to incur detrimental effect to stored vegetables and fruits.

The Fourteenth Embodiment

Figure 24:
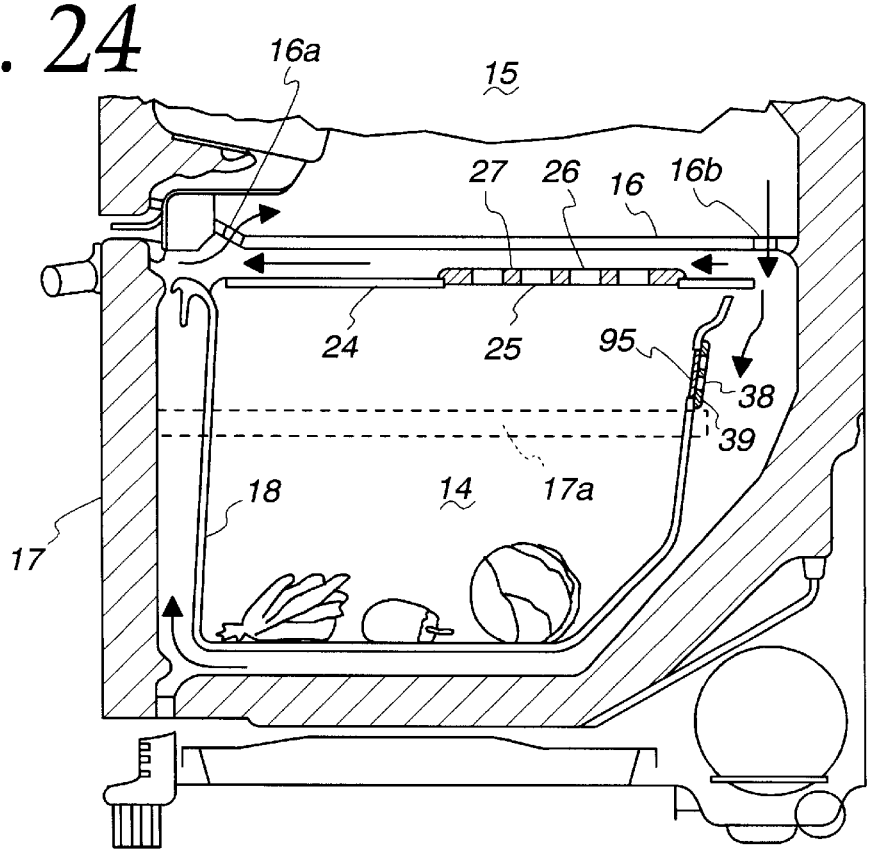
FIG. 24 is a vertical sectional view of a vegetable storage chamber of a refrigerator according to the fifteenth embodiment of the invention.

Referring now to FIG. 24, the fourteenth embodiment of the invention is described below. Those component parts identical to those of the preceding embodiments are designated by the identical reference numerals.

FIG. 24 illustrates vertical section of the vegetable storage chamber 14 of the refrigerator according to the fourteenth embodiment of the invention. The vegetable storage chamber 14 is an improved model from the one shown in FIG. 19 illustrating the eleventh embodiment. The fourteenth embodiment makes difference from the eleventh embodiment in that the moisture-permeable film 95 having the shape-memory resin characteristic is provided not only for the lid member 24, but also for the back surface of the vegetable-storage container 18 where dewing symptom can easily be generated.

In the same way as the other moisture-permeable film 25 set to the lid member 24, the moisture-permeable film 95 is integrally set to the discretely available parts 39 having lattice-form aperture 38.

As was just described above, not only for the lid member 24 provided with the moisture-permeable film 25, but the moisture-permeable film 95 is also set to a specific portion likely to generate dewing symptom on the back surface of the vegetable-storage container 18, and thus, practical effect for preventing dewing symptom from occurrence can be enhanced while preserving the vegetable storage chamber 14 at a high humidity level suited for vegetables.

The Fifteenth Embodiment

Referring again to FIG. 17, the fifteenth embodiment of the invention is described below. The fifteenth embodiment makes difference from the preceding embodiments in that anti-bacili effect has been provided for the moisture-permeable film 80. Concretely, by dispersing silver-based anti-bacili agent (not illustrated) in the moisture-permeable film 80, the film 80 has been provided with anti-bacili function. The above-referred silver-based anti-bacili agent is identified as "AMENITOP" (a product of Fuji Davison Chemical Co., Ltd.) comprising thiosulfato silver complex salt carried by silica gel.

Since silver-based anti-bacili agent has been dispersed in the moisture-permeable film 80, it is now possible to safely (from the food-hygienic viewpoint) prevent sloppy condition from being generated on the shape-memory resin film 22 disposed on inner surface of the vegetable-storage chamber 14 likely to incur generation of high-degree humidity.

It is also possible for the fifteenth embodiment to provide anti-bacili effect for the moisture-permeable film by impregnating the anti-bacili agent into the shape-memory resin film 24 or basic cloths used for implementing the first through nineth embodiments with anti-mold agent therein.

The Sixteenth Embodiment

Figure 25:
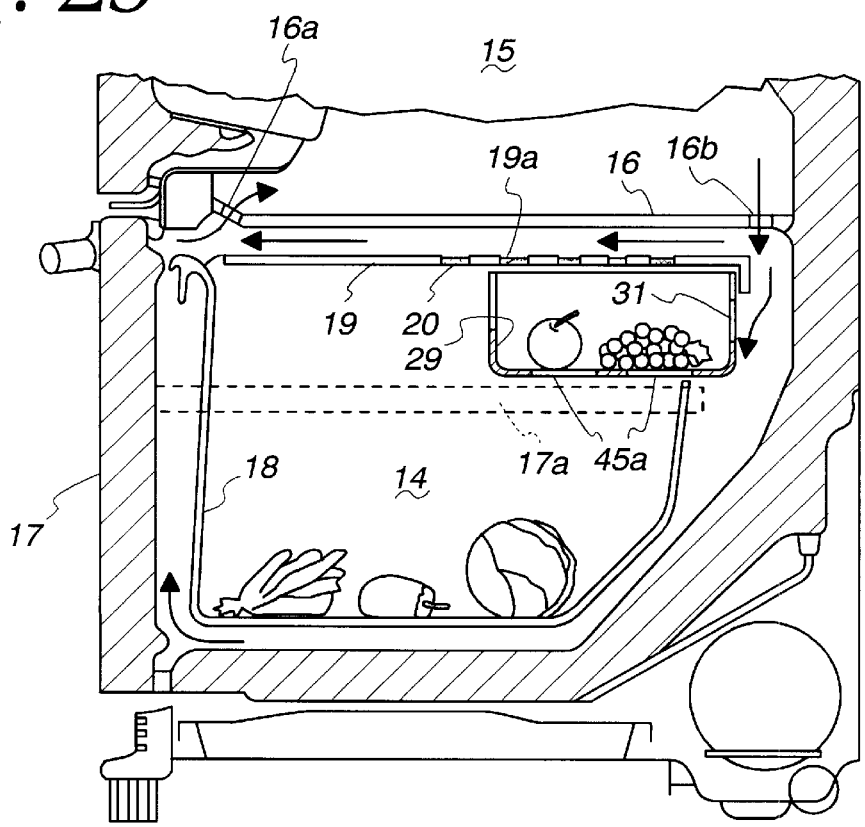
FIG. 25 is a vertical sectional view of a vegetable storage chamber of a refrigerator according to a sixteenth embodiment of the invention.
Figure 26:
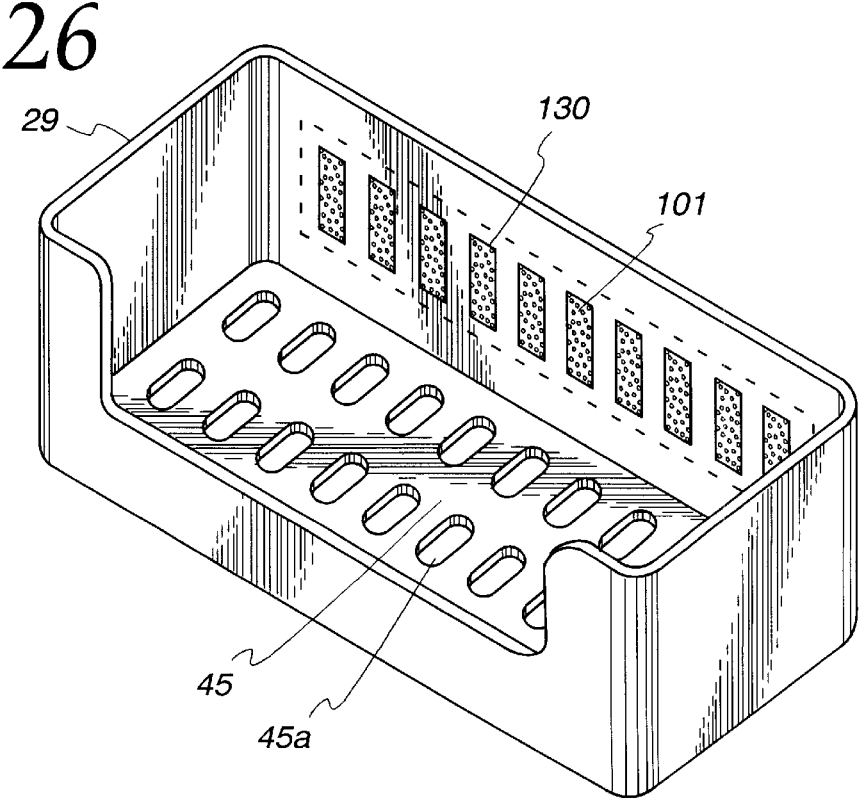
FIG. 26 is a perspective view of a fruit container according to the sixteenth embodiment of the invention.
Figure 27:
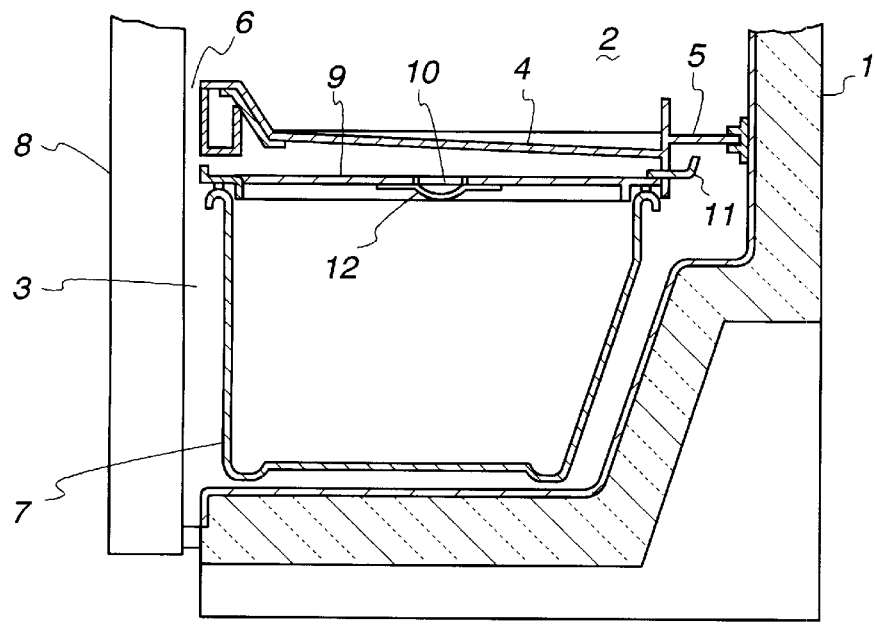
FIG. 27 is a vertical sectional view of a vegetable storage chamber of a conventional refrigerator.
Figure 28:
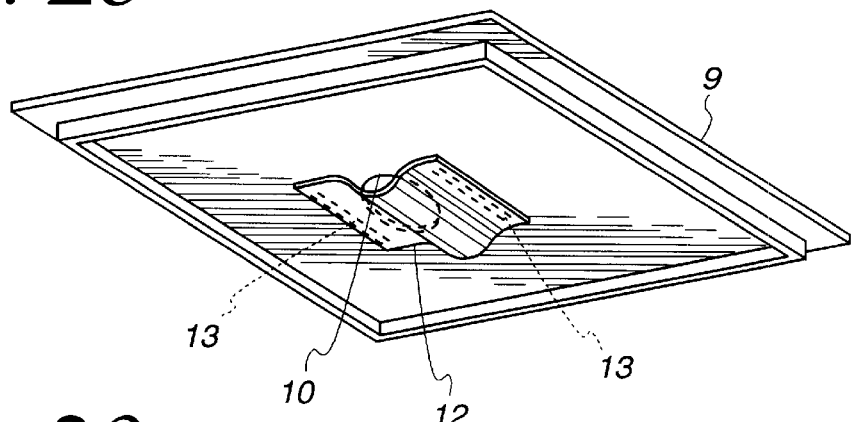
FIG. 28 is a perspective view illustrating open condition of the moisture-sensitive sheet provided for the lid of a conventional vegetable storage chamber.
Figure 29:
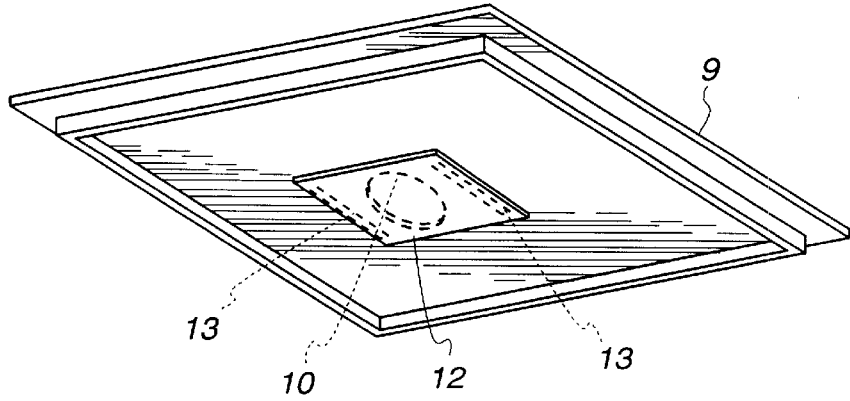
FIG. 29 is a perspective view illustrating closed condition of the moisture-sensitive sheet provided for the lid of a conventional vegetable storage chamber.

Referring now to FIG. 25 and FIG. 26, the sixteenth embodiment of the invention is described below. Those component parts identical to those which are used for the preceding embodiments are designated by identical reference numerals, The sixteenth embodiment makes difference from the preceding embodiments in that a cutout portion has been provided on the upper back surface of the vegetable-storage container 18 and a fruit container 29 has been accommodated therein. A lattice-form aperture 130 is formed through the back surface of the fruit container 29. In this embodiment, the moisture-permeable films 101 are integrally formed in the lattice-form aperture 130 formed on the back surface of the fruit container 18. The moisture-permeable film 101 is composed of such a integrated-structure identical to that was used for the fifteenth embodiment.

A number of through-holes 45a are formed through bottom surface of the fruit container 29, where each hole 45a has such a size just enough to prevent small fruits from falling down there through.

Next, referring to FIG. 25 and FIG. 26, operation of the novel refrigerator featuring the above structure is described below solely in regard to the difference from the first embodiment.

As shown in FIG. 25, the fruit container 29 is accommodated in a cutout portion on the upper back surface of the vegetable-storage container 48, where the back surface of the fruit container 29 forms part of the back surface of the vegetable-storage container 18. However, according to this structure, whenever fruits are stored in the fruit container 29, structurally, since temperature on the back surface of the fruit container 29 is apt to be lowered, dewing symptom can easily be generated. Consequently, large volume of water generated by dewing constantly remains inside of the fruit container to cause the stored fruits to be rotten.

Nevertheless, since the sixteenth embodiment integrally forms the moisture-permeable films 101 on the back surface of the fruit container 29, based on principle identical to that was described earlier in relation to the first embodiment, humid-permeability is properly controlled.

Furthermore, humid-vapor evaporated from fruits stored on the bottom surface of the vegetable-storage container 48 permeates through-holes 45a formed through bottom surface 45 of the fruit container 29, and then, due to difference in humid-vapor partial pressure, humid-vapor is discharged out of the container 29 bearing low humidity via the moisture-permeable film 20 of the upper lid member 19 or via the moisture-permeable films 101 formed on the back surface of the fruit container 29.

As was just described above, according to the sixteenth embodiment, the fruit container 29 is accommodated in cutout portion on the upper back surface of the vegetable-storage container 18, and yet, by integrally forming the shape-memory resin-made moisture-permeable films 101 in the corresponding lattice-form apertures 130 formed on the back surface of the fruit container 29, it is possible to properly maintain high humidity while preventing dewing symptom from being generated on the back surface of the fruit container 29 on which dewing symptom can easily be generated in particular. Consequently, fruits stored in the fruit container 29 can be prevented from being rotten without causing them to be dried.

Furthermore, unlike any conventional vegetable-storage container 18 in which humid-vapor evaporated from fruits stored on bottom surface thereof causes generation of large volume of dew on outer surface of the bottom surface 45 of the conventional fruit container 29 to cause fruits on the bottom surface to be rotten by effect of dropped water generated by dew, the sixteenth embodiment provides a number of through-holes 45a through bottom surface 45 of the fruit container 29 to enable the moisture-permeable films 20 integrated with the upper lid member 19 or the moisture-permeable films 101 set to the back surface of the fruit container 29 to fully exert proper function. In consequence, dewing symptom can be prevented from being generated on outer surface of the bottom surface 45 of the fruit container 29 to eventually prevent fruits from being rotten by effect of dropped water generated by dew, and thus, freshness of fruits stored in the fruit container 29 can more securely be preserved than any of conventional fruit containers.

Although it is most effective to simultaneously use the moisture-permeable films 20 and 101 (provided for the lid member 19 and on the back surface of the fruit container 29), taking cost into consideration, it is allowable to solely use either of the moisture-permeable films 20 or 101.

Industrial Applicability

As is apparent from the foregoing description, the inventive incorporates humid-vapor-permeable moisture-permeable films comprising shape-memory resin such as hydrophilic polyurethane resin or the like and basic cloths or a textile composed of nylon or polyester woven or non-woven cloth. Humid-vapor permeability of the moisture-permeable films properly varies in correspondence with varied temperature and stored volume of vegetable inside of the vegetable-storage chamber to enable the storage chamber to maintain high humidity suited for vegetables while preventing dewing from being generated therein. Accordingly, the inventive refrigerator can securely preserve vegetables in fresh condition for a long period of time. Furthermore, since the moisture-permeable films are not subject to mechanical deformation, variability of humid-vapor permeability can be maintained for a long period of time to ensure lasting durability. Accordingly, there is high possibility of utilizing the inventive refrigerator for conventional home use and operating business.

What is claimed is:

1. An apparatus for keeping produce fresh, comprising:
    a container having an open top surface;
    a lid provided in close contact with and covering said open top surface of said container, said lid provided with at least one through-hole; and
    a moisture-permeable film disposed in said at least one through-hole of said lid,
    wherein said moisture-permeable film includes a first humid-vapor permeable cloth and a shape-memory resin layer adhesively attached to said permeable cloth.

2. The apparatus of claim 1, wherein
    said container includes a back surface provided with at least one through-hole, and said moisture-permeable film is disposed in said at least one through-hole of said back surface.

3. The apparatus of claim 1, wherein said first humid-vapor permeable cloth is made of nylon or polyester, and said shape-memory resin layer is made of a hydrophilic polyurethane resin.

4. The apparatus of claim 1, wherein said first humid-vapor permeable cloth is adhesively secured to said shape-memory resin layer via adhesive layers interspersed at predetermined intervals.

5. The apparatus of claim 1, wherein said first humid-vapor permeable cloth is made of nylon or polyester, and said shape-memory resin layer is made of a blend of hydrophilic polyurethane resin and hydrophobic shape-memory resin blended in a predetermined ratio.

6. The apparatus of claim 1, further comprising a heat-insulation layer adhesively secured to said first humid-vapor permeable cloth, wherein said heat-insulation layer is disposed on an outer surface of said lid, and said shape-memory resin layer is disposed on an inner surface of said lid.

7. The apparatus of claim 6, wherein said heat-insulation layer includes woven or non-woven cloth having high humid-permeability and thermal-insulation properties.

8. The apparatus of claim 7, wherein said heat-insulation layer has a thermal conductive coefficient equal to that of said container.

9. The apparatus of claim 1, further comprising:
a second humid-vapor permeable cloth adhesively secured to said shape-memory resin layer opposite said first humid-vapor permeable cloth, said second humid-vapor permeable cloth disposed on an inner surface of said lid; and
a heat insulation layer adhesively secured to said first humid-vapor permeable cloth, said heat insulation layer disposed on an outer surface of said lid.

10. The apparatus of claim 9, wherein said first humid-vapor permeable cloth has a thermal-insulation coefficient greater than that of said second humid-vapor permeable cloth.

11. The apparatus of claim 1, further comprising a humid-permeable cover sheet bonded to an outer surface of said lid and covering all of said at least one through-holes, wherein an air layer is formed between said cover sheet and said moisture-permeable film disposed in said at least one through-hole.

12. The apparatus of claim 1, wherein said moisture-permeable film has a moisture permeability which quickly varies in a temperature zone of approximately 0° C.–10° C.

13. An apparatus for keeping produce fresh, comprising:
a container having an open top surface;
a lid provided in close contact with and covering said open top surface of said container, said lid provided with at least one through-hole; and
a moisture-permeable film disposed in said at least one through-hole of said lid,
wherein said moisture-permeable film includes a shape-memory resin layer having opposing surfaces and first and second humid-vapor permeable cloths adhesively secured to said resin layer opposing surfaces, respectively.

14. An apparatus for keeping produce fresh, comprising:
a container having an open top surface;
a lid provided in close contact with and covering said open top surface of said container, said lid provided with at least one through-hole; and
a moisture-permeable film disposed in said at least one through-hole of said lid,
wherein said moisture-permeable film includes at least two layers of humid-vapor permeable cloths adhesively secured to one another and a shape-memory resin layer adhesively secured to said humid-vapor permeable cloths, wherein said resin layer is disposed on an inner surface of said lid, and an end layer of said permeable cloth layers is disposed on an outer surface of said lid.

15. An apparatus for keeping produce fresh, comprising:
a container having an open top surface;
a lid provided in close contact with and covering said open top surface of said container, said lid provided with at least one through-hole; and
a moisture-permeable film disposed in said at least one through-hole of said lid,
wherein said moisture-permeable film includes a humid-vapor permeable textile and a shape-memory resin layer coated on at least one surface of said permeable textile.

16. An apparatus for keeping produce fresh, comprising:
a container having an open top surface;
a fruit container attached to a back surface of said container and disposed inside said container,
wherein said container includes a cutout portion on an upper back surface of said container and said fruit container is provided therein such that a back surface of said fruit container forms part of said back surface of said container;
a lid provided in close contact with and covering said open top surface of said container, said lid provided with at least one aperture; and
a moisture-permeable film disposed in said at least one aperture of said lid.

17. The apparatus of claim 13, wherein said first and second humid-vapor permeable cloths are treated with a water-repellent finish.

18. The apparatus of claim 17, wherein said water-repellent finish includes a fluoro-carbon resin or a silicone resin.

19. The apparatus of claim 14, wherein said layers of humid-permeable cloths include woven or non-woven cloth made from nylon or polyester.

20. The apparatus of claim 14, further comprising spacers between said layers of humid-vapor permeable cloths forming air layers therebetween.

21. The apparatus of claim 15, wherein said humid-vapor permeable textile is made from nylon or polyester resin, and said shape-memory resin layer is made from a hydrophilic polyurethane resin.

22. The apparatus of claim 15, wherein said shape-memory resin layer is coated on selected portions of said humid-vapor permeable textile.

23. The apparatus of claim 15, wherein said shape-memory resin layer is coated on said humid-vapor permeable textile in dotted form on a predetermined area.

24. The apparatus of claim 15, wherein said moisture-permeable film is provided with a plurality of fine through-holes.

25. The apparatus of claim 24, wherein any carbon acid gas or ethylene gas present in said container is effectively removed from said container.

26. The apparatus of claim 15, wherein a silver-based anti-bacili agent is dispersed in said moisture permeable film.

27. The apparatus of claim 26, wherein said silver-based anti-bacili agent includes a thiosulfato silver complex salt carried by a silica gel.

28. An apparatus for keeping produce fresh, comprising:

a container having an open top surface;

a fruit container attached to a back surface of said container and disposed inside said container;

a lid provided in close contact with and covering said open top surface of said container, said lid provided with at least one aperture; and a moisture-permeable film disposed in said at least one aperture of said lid, wherein said moisture-permeable film includes a humid-vapor permeable cloth and a shape-memory resin layer adhesively attached to said permeable cloth.

29. The apparatus of claim 28, wherein said humid-vapor permeable cloth is made of nylon or polyester, and said shape-memory resin layer is made of a hydrophilic polyurethane resin.

30. The apparatus of claim 28, wherein said moisture-permeable film is also disposed in at least one aperture formed in said back surface of said container.

31. The apparatus of claim 16, wherein said back surface of said fruit container includes a plurality of lattice-formed apertures, and said moisture-permeable film is integrally formed in said lattice-formed apertures.

32. The apparatus of claim 31, wherein at least one through-hole is provided on a bottom surface of said fruit container.

33. The apparatus of claim 32, wherein each of said at least one through-hole is sized to prevent small fruits from falling down therethrough.

34. The apparatus of claim 28, wherein said at least one aperture on said lid is provided at a location on said lid where a dewing symptom is likely to be generated.

35. In a refrigerator having a refrigerating chamber and a vegetable storage chamber cooled by cooling air from said refrigerating chamber, an apparatus disposed in said vegetable storage chamber for keeping produce fresh, the apparatus comprising:

a container having an open top surface;

a lid provided in close contact with and covering said open top surface of said container, said lid provided with at least one aperture; and a moisture-permeable film disposed in said at least one aperture in said lid, wherein said moisture-permeable film includes a humid-vapor permeable cloth and a shape-memory resin layer adhesively attached to said permeable cloth.

36. The apparatus of claim 35, wherein said humid-vapor permeable cloth is made of nylon or polyester, and said shape-memory resin layer is made of a hydrophilic polyurethane resin.

37. The apparatus of claim 35, wherein said humid-vapor permeable cloth is made of nylon or polyester, and said shape-memory resin layer is made of a blend of hydrophilic polyurethane resin and hydrophobic shape-memory resin blended in a predetermined ratio.

38. An apparatus for keeping produce fresh, comprising:

a container having a back surface provided with at least one aperture and an open top surface;

a lid provided in close contact with and covering said open top surface of said container; and a moisture-permeable film disposed in said at least one aperture in said back surface of said container, wherein said moisture-permeable film includes a humid-vapor permeable cloth made of nylon or polyester and a shape-memory resin layer adhesively attached to said permeable cloth.

39. The apparatus of claim 38, wherein said shape-memory resin layer is made of a hydrophilic polyurethane resin or a blend of hydrophilic polyurethane resin and hydrophobic shape-memory resin blended in a predetermined ratio.

* * * * *